(12) United States Patent
Breed

(10) Patent No.: US 9,039,038 B2
(45) Date of Patent: May 26, 2015

(54) STEERING WHEEL MOUNTED ASPIRATED AIRBAG SYSTEM

(71) Applicant: Automotive Technologies International, Inc., Boonton, NJ (US)

(72) Inventor: David S Breed, Miami Beach, FL (US)

(73) Assignee: Automotive Technologies International, Inc., Boonton, NJ (US)

( * ) Notice: Subject to any disclaimer, the term of this patent is extended or adjusted under 35 U.S.C. 154(b) by 0 days.

(21) Appl. No.: 14/456,522

(22) Filed: Aug. 11, 2014

(65) Prior Publication Data

US 2014/0361522 A1    Dec. 11, 2014

Related U.S. Application Data

(63) Continuation-in-part of application No. 13/699,390, filed as application No. PCT/US2011/038911 on Jun. 2, 2011, now Pat. No. 8,801,033.

(60) Provisional application No. 61/350,756, filed on Jun. 2, 2010.

(51) Int. Cl.
 *B60R 21/30*    (2006.01)

(52) U.S. Cl.
 CPC ...................................... *B60R 21/30* (2013.01)

(58) Field of Classification Search
 CPC ............................. B60R 21/30; B60R 21/203
 See application file for complete search history.

(56) References Cited

U.S. PATENT DOCUMENTS

| 3,624,810 | A | * | 11/1971 | Hass | 280/738 |
| 3,632,133 | A | * | 1/1972 | Hass | 280/738 |
| 3,843,152 | A | * | 10/1974 | Nonaka | 280/731 |
| 3,909,037 | A | * | 9/1975 | Stewart | 280/738 |
| RE29,228 | E | * | 5/1977 | Hass | 280/738 |
| 4,711,125 | A | | 12/1987 | Morrison | |
| 5,129,674 | A | * | 7/1992 | Levosinski | 280/738 |
| 5,398,963 | A | | 3/1995 | Fohl | |
| 5,403,034 | A | | 4/1995 | Gans et al. | |

(Continued)

FOREIGN PATENT DOCUMENTS

| GB | 1184122 A | 3/1970 |
| WO | 9610497 A1 | 4/1996 |

(Continued)

OTHER PUBLICATIONS

Supplementary European Search Report for European Patent Application No. 11 83 7015 dated May 9, 2014.

*Primary Examiner* — Drew Brown
(74) *Attorney, Agent, or Firm* — Brian Roffe

(57) ABSTRACT

Aspirator for an airbag deploying into a vehicle passenger compartment in order to protect a driver of the vehicle during an accident, includes a housing having an innermost and an outermost wall and defining an outlet at a distal end leading to an airbag and coaxial flow passages between the innermost and outermost walls into which air from a passenger compartment flows to inflate the airbag. An aspiration system is coupled to the housing and configured to direct gas into the flow passages to mix with the air from the passenger compartment in the flow passages. The aspiration system includes openings on an inner side of the outermost wall and on an outer side of the innermost wall. These openings are configured such that the gas is directed therefrom into the flow passages in a direction substantially parallel to a flow direction of air into the flow passages.

20 Claims, 14 Drawing Sheets

(56) References Cited

U.S. PATENT DOCUMENTS

| | | | |
|---|---|---|---|
| 5,437,473 A | 8/1995 | Henseler | |
| 5,441,301 A | 8/1995 | Breed et al. | |
| 5,441,303 A * | 8/1995 | Rozanski | 280/738 |
| 5,653,464 A | 8/1997 | Breed et al. | |
| 5,797,623 A | 8/1998 | Hubbard | |
| 5,803,494 A | 9/1998 | Headley | |
| 5,829,780 A | 11/1998 | Tesauro et al. | |
| 5,863,068 A | 1/1999 | Breed | |
| 5,954,359 A | 9/1999 | Ross | |
| 5,990,569 A | 11/1999 | Lundberg | |
| 6,097,284 A | 8/2000 | Nitschke et al. | |
| 6,129,374 A | 10/2000 | Yamada et al. | |
| 6,206,129 B1 | 3/2001 | Breed et al. | |
| 6,328,126 B2 | 12/2001 | Breed et al. | |
| 6,517,105 B1 | 2/2003 | Ford | |
| 6,553,914 B2 | 4/2003 | Hosey et al. | |
| 6,661,115 B2 | 12/2003 | Lester | |
| 7,098,778 B1 | 8/2006 | Zoratti et al. | |
| 7,139,651 B2 | 11/2006 | Knowlton et al. | |
| 7,243,945 B2 | 7/2007 | Breed et al. | |
| 7,352,080 B2 | 4/2008 | Grasshoff | |
| 7,421,321 B2 | 9/2008 | Breed et al. | |
| 7,481,453 B2 | 1/2009 | Breed | |
| 7,556,118 B2 | 7/2009 | Huh et al. | |
| 7,570,068 B2 | 8/2009 | Bauer et al. | |
| 7,744,122 B2 | 6/2010 | Breed | |
| 7,766,383 B2 | 8/2010 | Breed et al. | |
| 7,820,566 B2 | 10/2010 | Breed et al. | |
| 2002/0027346 A1 * | 3/2002 | Breed et al. | 280/735 |
| 2002/0101067 A1 * | 8/2002 | Breed | 280/741 |
| 2002/0190505 A1 | 12/2002 | Feistel et al. | |
| 2004/0199318 A1 | 10/2004 | Shieh et al. | |
| 2006/0192373 A1 | 8/2006 | Manley | |
| 2006/0232052 A1 | 10/2006 | Breed | |
| 2007/0192007 A1 | 8/2007 | Stanley et al. | |
| 2007/0235996 A1 | 10/2007 | Huh et al. | |
| 2009/0150029 A1 | 6/2009 | Pavelescu et al. | |
| 2009/0224515 A1 | 9/2009 | Breed et al. | |
| 2009/0256339 A1 | 10/2009 | Mampe | |
| 2011/0042929 A1 | 2/2011 | Breed et al. | |
| 2012/0205901 A1 | 8/2012 | Westoby | |

FOREIGN PATENT DOCUMENTS

| | | |
|---|---|---|
| WO | 9613406 A1 | 5/1996 |
| WO | 0121450 A1 | 3/2001 |
| WO | 2006086247 A2 | 8/2006 |
| WO | 2010015809 A1 | 2/2010 |

* cited by examiner

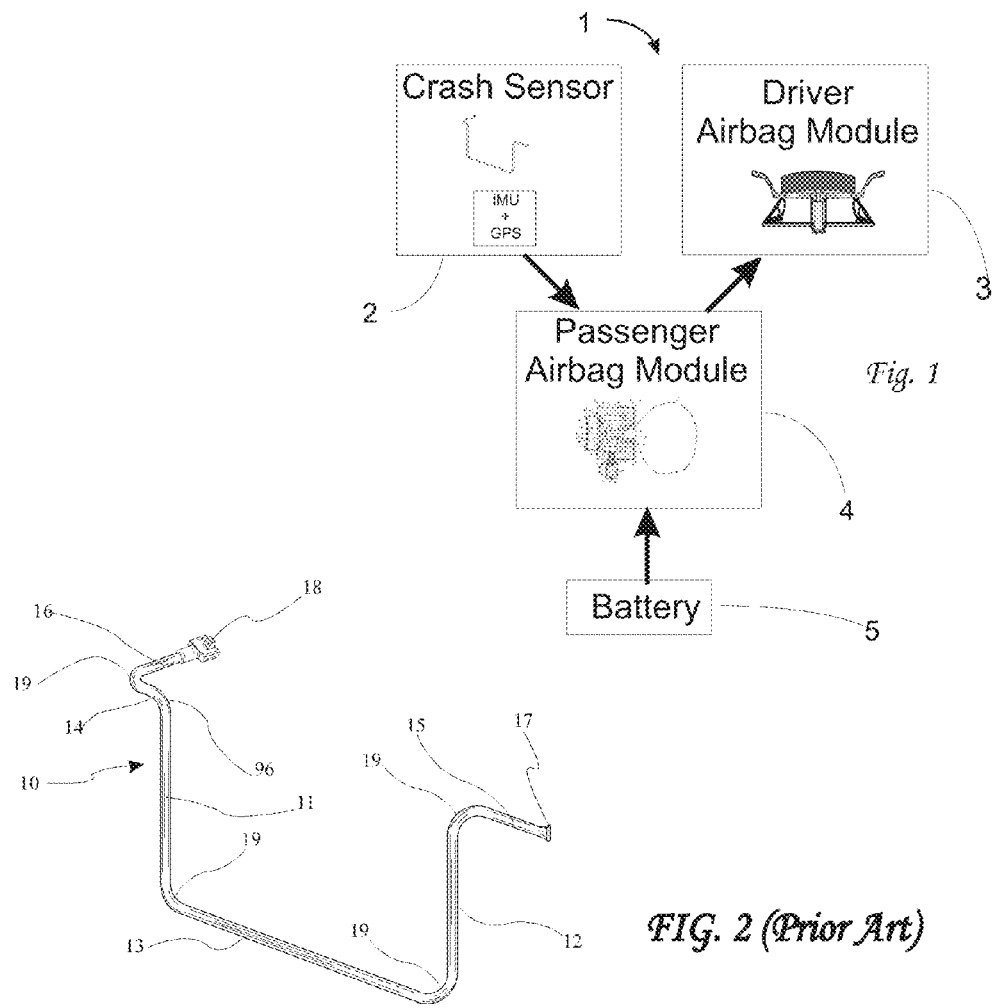
Fig. 1
FIG. 2 (Prior Art)
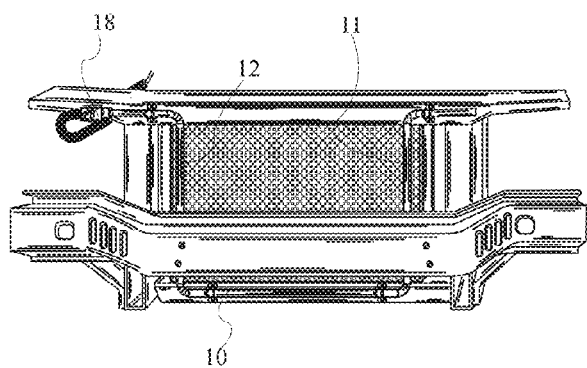
FIG. 2A (Prior Art)

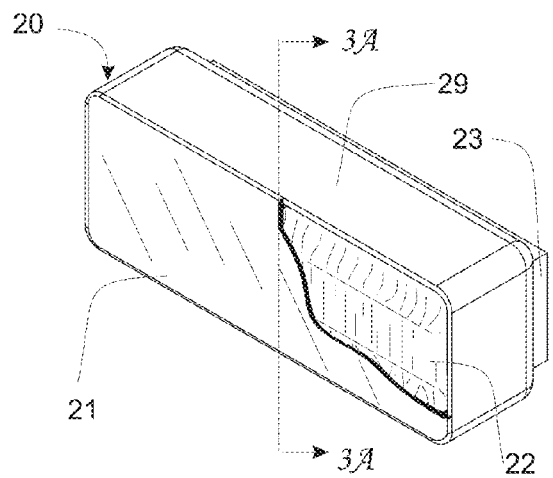
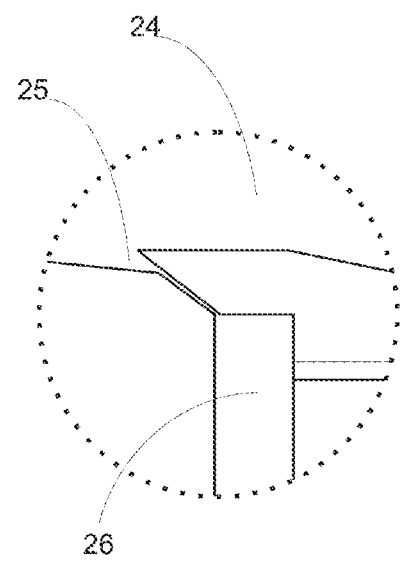
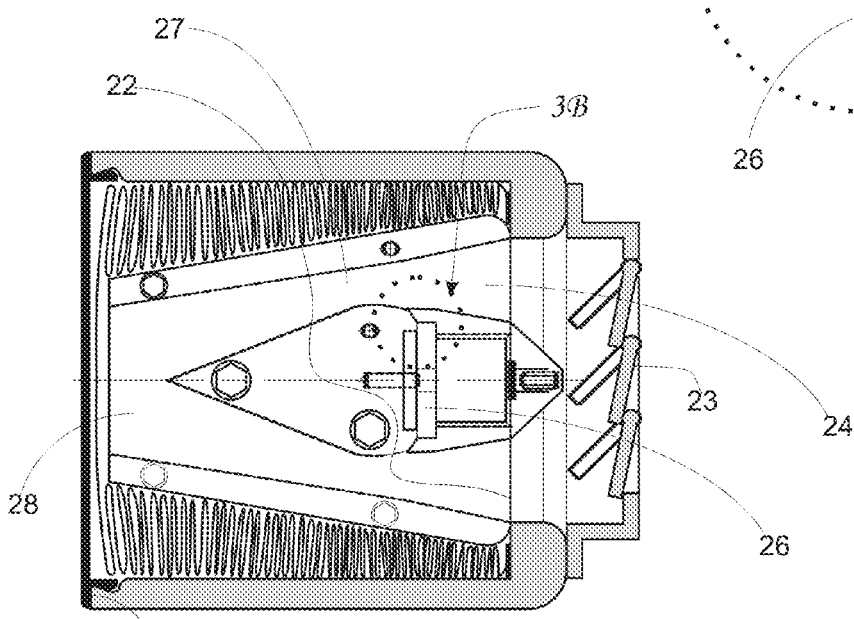
Fig. 3
Fig. 3B
Fig. 3A

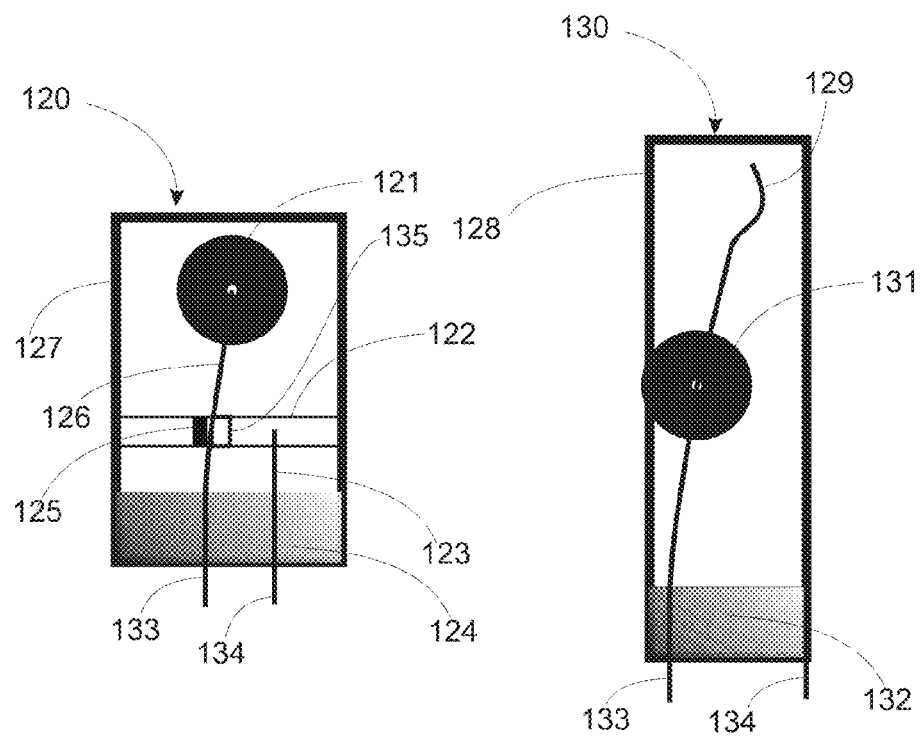
Fig. 12A
Fig. 12B
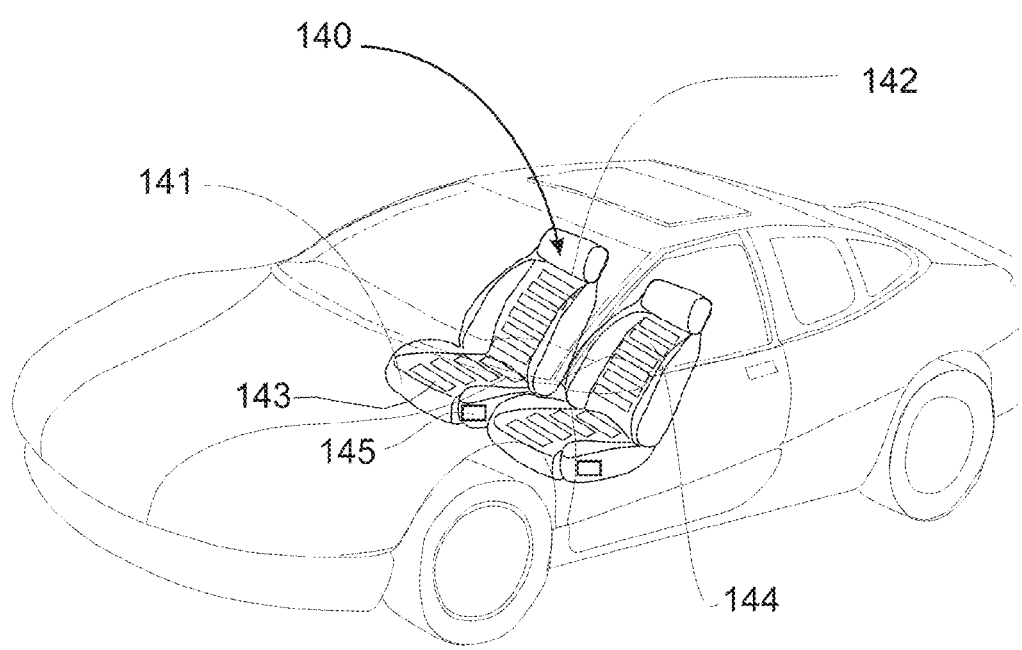
Fig. 13

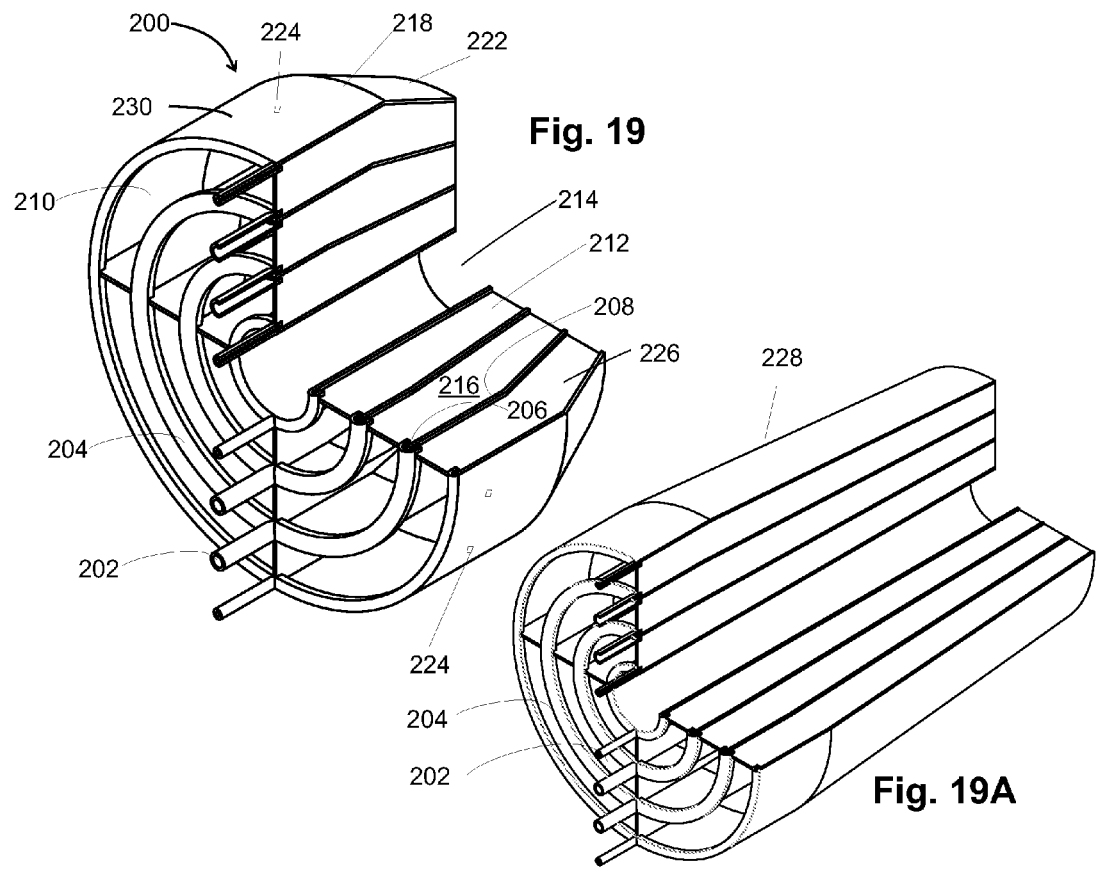
Fig. 19
Fig. 19A
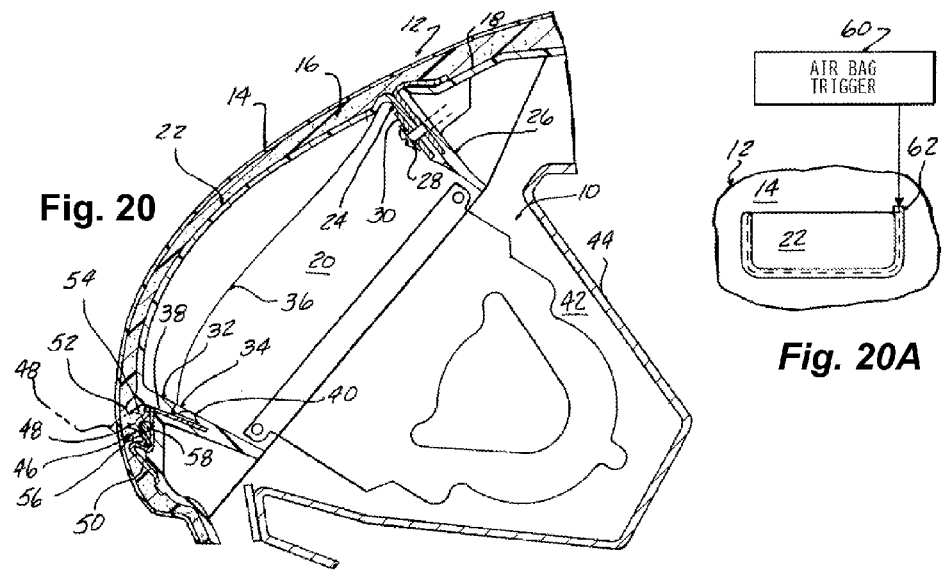
Fig. 20
Fig. 20A

STEERING WHEEL MOUNTED ASPIRATED AIRBAG SYSTEM

CROSS-REFERENCE TO RELATED APPLICATIONS

This application is a continuation-in-part of U.S. patent application Ser. No. 13/699,390 filed Nov. 21, 2012, which is a National Stage filing of International Application No. PCT/US2011/038911 filed Jun. 2, 2011, which claims priority of U.S. provisional patent application Ser. No. 61/350,756 filed Jun. 2, 2010, all of which are incorporated by reference herein.

FIELD OF THE INVENTION

The present invention relates to low cost, aspirated airbag systems which are primarily targeted for use in developing countries but may also find application on low cost vehicles in developed countries.

BACKGROUND OF THE INVENTION

Much of the world's people are now moving out of poverty where they have limited discretionary funds but have aspirations of leading a better life. This has given rise to a potentially explosive market for very low cost motor vehicles, such as the Tata Nano. This explosive growth will also result in an explosive growth in the number of people killed while driving such vehicles and hence there is a need for low cost passive safety systems, such as seatbelts and airbags. The Tata Nano sells in India for between $2000 and $2500 and company management has stated that their goal is for a $10 airbag system or $20 for the driver and passenger systems per vehicle. The inventions disclosed herein are directed toward such a very low cost airbag system.

SUMMARY OF THE INVENTION

Aspirator for an airbag deploying into a vehicle passenger compartment in order to protect, for example, a driver of the vehicle during an accident involving the vehicle, includes a housing comprising an innermost and an outermost wall and defining an inlet at a proximal end, an outlet at a distal end leading to an airbag and a plurality of coaxial flow passages between the innermost and outermost walls into which air from a passenger compartment flows to inflate the airbag. An aspiration system is coupled to the housing and configured to direct gas into the flow passages to mix with the air from the passenger compartment in the flow passages. The aspiration system includes openings on an inner side of the outermost wall and on an outer side of the innermost wall. These openings are preferably configured such that the gas is directed from the openings into the flow passages in a direction substantially parallel to a flow direction of air into the flow passages.

In one embodiment, the housing further includes at least one interior wall arranged between and spaced apart from the innermost and outermost walls such that the flow passages are defined by the innermost wall, the outermost wall and the interior wall(s). For example, if there is one interior wall, one flow passage is formed between this interior wall and the outermost wall and another flow passage is formed between the innermost wall and the interior wall. If there are two interior walls, one flow passage is formed between the outermost wall and the interior wall closest to the outermost wall, another flow passage is formed between the interior walls, and another flow passage is formed between the interior wall closest to the innermost wall and the innermost wall.

The aspiration system further includes a respective annular distributor arranged rearward of each interior wall, the openings extending from each annular distributor on both sides of each interior wall. An annular distributor is arranged rearward of the innermost wall and an opening extends therefrom to the outer side of the innermost wall. An annular distributor is arranged rearward of the outermost wall and an opening extends therefrom to the inner side of the outermost wall. At least one tube is associated with each annular distributor to convey the gas from, for example, a source thereof, to the annular distributor and then into the flow passage(s).

The innermost and outermost walls may each include a cylindrical portion at the proximal end of the housing and a truncated conical portion at the distal end of the housing. The housing defines one or more inlet openings at a proximal end in flow communication with the flow passages, these inlet openings allowing for air from the passenger compartment to flow into the flow passages.

The housing further includes at least one separation wall extending between and connected to the innermost and outermost walls. The separation wall may be segmented into aligning, discrete portions, one in each flow passage.

The outermost wall may include a plurality of apertures to provide for flow communication between one of the flow passages defined in part by the outermost wall and ambient atmosphere around the housing.

Another embodiment of an aspirator for an airbag deploying into a vehicle passenger compartment in accordance with the invention includes a housing comprising an innermost wall, an outermost wall, and at least one interior wall arranged between the innermost and outermost walls. The housing defines an inlet at a proximal end, an outlet at a distal end leading to an airbag and a plurality of annular flow passages between the innermost and outermost walls into which air from a passenger compartment flows to inflate the airbag. An aspiration system is coupled to the housing and is configured to direct gas into the flow passages to mix with the air from the passenger compartment in the flow passages. The aspiration system includes openings on an inner side of the outermost wall, on an outer side of the innermost wall, and on both sides of each interior wall.

The variations of the aspiration system described above may also be implemented in this embodiment.

Another embodiment of an aspirator for an airbag deploying into a vehicle passenger compartment in accordance with the invention includes a housing comprising an innermost and an outermost wall, and defining an inlet at a proximal end, an outlet at a distal end leading to an airbag and at least one flow passage between the innermost and outermost walls into which air from a passenger compartment flows to inflate the airbag. An aspiration system is coupled to the housing and is configured to direct gas into each flow passage to mix with the air from the passenger compartment in each flow passage. The aspiration system includes a first annular distributor arranged rearward of the innermost wall, a second annular distributor arranged rearward of the outermost wall, openings extending from the first annular distributor on an outer side of the inner wall and openings extending from the second annular distributor on an inner side of the outermost wall.

The variations of the aspiration system described above may also be implemented in this embodiment.

Numerous additions and modification to the above-described preferred system are possible and many will be described below, and others will become obvious to those skilled in the art after reading this specification.

BRIEF DESCRIPTION OF THE DRAWINGS

The following drawings are illustrative of embodiments of the invention and are not meant to limit the scope of the invention as encompassed by the claims.

FIG. 1 is a schematic diagram of a preferred embodiment of an airbag system of the invention.

FIG. 2 is an illustration of a prior art version of a crush sensing crash sensor for sensing frontal crashes and FIG. 2A illustrates the mounting of such a sensor to the radiator structure of a vehicle.

FIG. 3 is a perspective view of the passenger airbag module of this invention, FIG. 3A is a cross section view taken at 3A-3A in FIG. 3 and FIG. 3B is an expanded view of a high-pressure injection duct taken in circle 3B of FIG. 3A.

FIGS. 12A and 12B illustrate an electromechanical arming sensor that can be used with the system.

FIG. 13 is an illustration of a capacitance or electric field based occupant presence, mass and health monitoring sensor which can be used with the system.

FIG. 19 illustrates a driver side aspirator design with a portion removed to enable an explanation of the interior of the aspirator.

FIG. 19A illustrates another aspirator with a lengthening of the flow path to increase flow mixing.

FIGS. 20 and 20A illustrate a pyrotechnic system for cutting a hole in the instrument panel to allow the passenger side airbag to deploy under low pressure.

DETAILED DESCRIPTION OF PREFERRED EMBODIMENTS

Figures 3C, 3D:
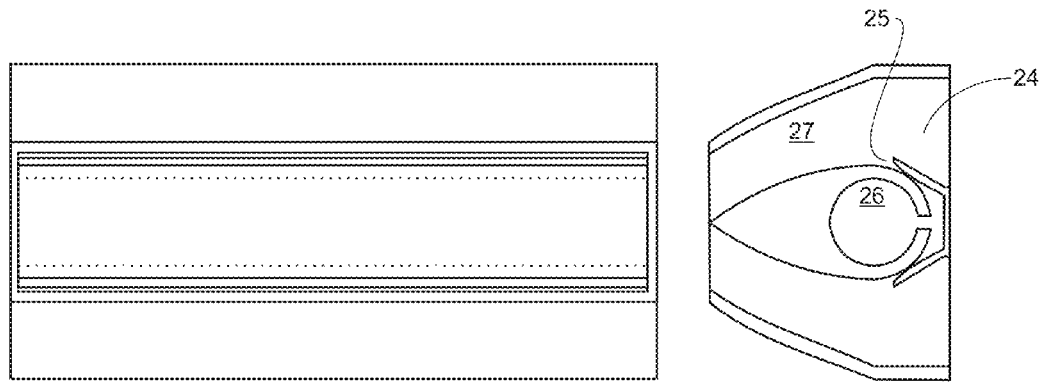
FIGS. 3C and 3D are details of aspirator designs of a preferred implementation of the passenger inflator system of FIG. 3 which results in an aspiration ratio of about 3.5.

Referring to the drawings wherein like reference numbers refer to the same or similar elements, a schematic diagram of a preferred embodiment of an airbag system 1 of the invention is illustrated in FIG. 1. The crash sensor 2 for this preferred implementation, which can be used as the primary crash sensor or in conjunction with a single point crash sensor, is a rod-in-tube crush sensing device, such as described in U.S. Pat. No. 7,481,453. This crash sensor 2 can be placed a calibrated distance rearward of the front of the vehicle such that a crushing of the vehicle to that location resulting in a bending of the tube is indicative of a crash requiring deployment of the passive restraint system. The airbag system, or more generally the passive restraint system, can include one or more airbags, seatbelt pretensioners, seatbelt airbags, nets or any other deployable passive restraint. In an alternative preferred implementation, a single point crash sensor can be used with or without a crush zone mounted crash sensor.

In FIG. 1, the airbag system is shown generally at 1, the crush sensors as crash sensors at 2, a driver airbag module at 3, a passenger airbag module at 4 and a battery at 5. The electronics control unit (ECU) can be housed within the passenger airbag module 4, separate from it or at any other convenient location. A single point crash sensor and an arming or safing sensor can be located within the ECU or separate from it.

A crush sensing sensor is shown generally at 10 in FIG. 2. In the implementation shown in U.S. Pat. No. 7,481,453, a sensor 10 comprises a unitary, tubular member having two vertical portions 11 and 12, a lower horizontal portion 13, two upper horizontal portions 14 and 15 and a rearward projecting portion 16. The sensor 10 is closed at an end 17 of horizontal portion 15, e.g., by welding, and a header/connector 18 is attached to the sensor 10 at the end of portion 16.

Sensor 10 can be mounted to the front of the vehicle and can be constructed of a tube and a centrally located rod which is substantially coextensive with the tube but normally not in contact therewith. The sensor 10 functions (for example to initiate deployment of an airbag) when it is bent at any position along the tube with the exception of pre-bent sections, such as bends 19, which join the vertical portions 11, 12 to the upper horizontal portions 14 respectively, and where plastic spacers, not shown, prevent the rod from contacting the tube as described in the '453 patent.

When the sensor 10 is bent during an accident, the rod, which is electrically conducting, approaches and potentially contacts the tube, which is also electrically conducting. When the rod contacts the tube, this indicates that an accident of sufficient severity as to require airbag deployment has occurred. There are other methods of using the rod-in-tube construction to sense accidents as disclosed in the '453 patent. An example of how the sensor 10 can be mounted to the radiator structure of a vehicle is shown in FIG. 2A for vehicles that have a front radiator structure.

A front passenger side airbag module according to the invention is illustrated generally at 20 in FIG. 3. Airbag module 20 comprises a housing 29, cover 21, airbag 22 and aspiration valve assembly 23. FIG. 3A illustrates a cross section view taken at 3A-3A in FIG. 3 and shows the relationship of the parts in more detail. Gas is fed into an aspiration section including the aspiration valve assembly 23 from a gas generator or compressed gas storage container, not shown, into channel 26 as shown in FIG. 3B. High pressure gas from channel 26 flows through restrictor 25 into a converging nozzle 24 where it mixes with and draws in gas from the passenger compartment through the aspiration valve assembly 23. Somewhat downstream from the converging nozzle 24, the mixed gas enters a diverging nozzle 27 and then into a section 28 where it flows into and inflates the airbag 22. FIGS. 3C and 3D illustrate the geometry of a preferred passenger inflator which yielded a pumping ratio of about 3.5. The pumping ratio is the ratio of the aspirated gas volume to the generated gas volume, in this case meaning that about 78% of the gas was from the passenger compartment and 22% from the gas generator.

In one implementation, when combustion of the propellant is initiated, as discussed below, a small about of high pressure gas, such as created when substantially pure BKNO3 is burned, enters the channel 26 and then flows into restrictor 25 and into the converging and diverging nozzles 24 and 27 respectively. This very high pressure and high temperature gas has very low density and thus flows rapidly into where it exerts a high pressure on the front of the airbag and the module cover causing the cover to be released and the airbag to begin initial deployment. This process lasts for a very short time, from about one to a few milliseconds, and occurs prior to the opening of the aspiration valve assembly 23. This initiation process causes the cover to be released and the airbag to begin to deploy. After a very short time period, the gas cools sufficiently to condense and create a vacuum in the airbag as well as in the various sections and nozzles 28, 27 and 24. This can then cause the aspiration valve assembly 23 to open and help start the aspiration process. By this time, the gas from the burning main propellant has begun to flow through channel 26 and restrictor 25 into converging nozzle 24. The gas from the main propellant then mixes with the gas from the atmosphere and the mixed gas inflates the airbag. By this process, aspiration rates exceeding 3 parts air from the passenger compartment to one part gas from the propellant can be achieved. Like numbers represent like parts in FIGS. 3-3D.

Figure 4:
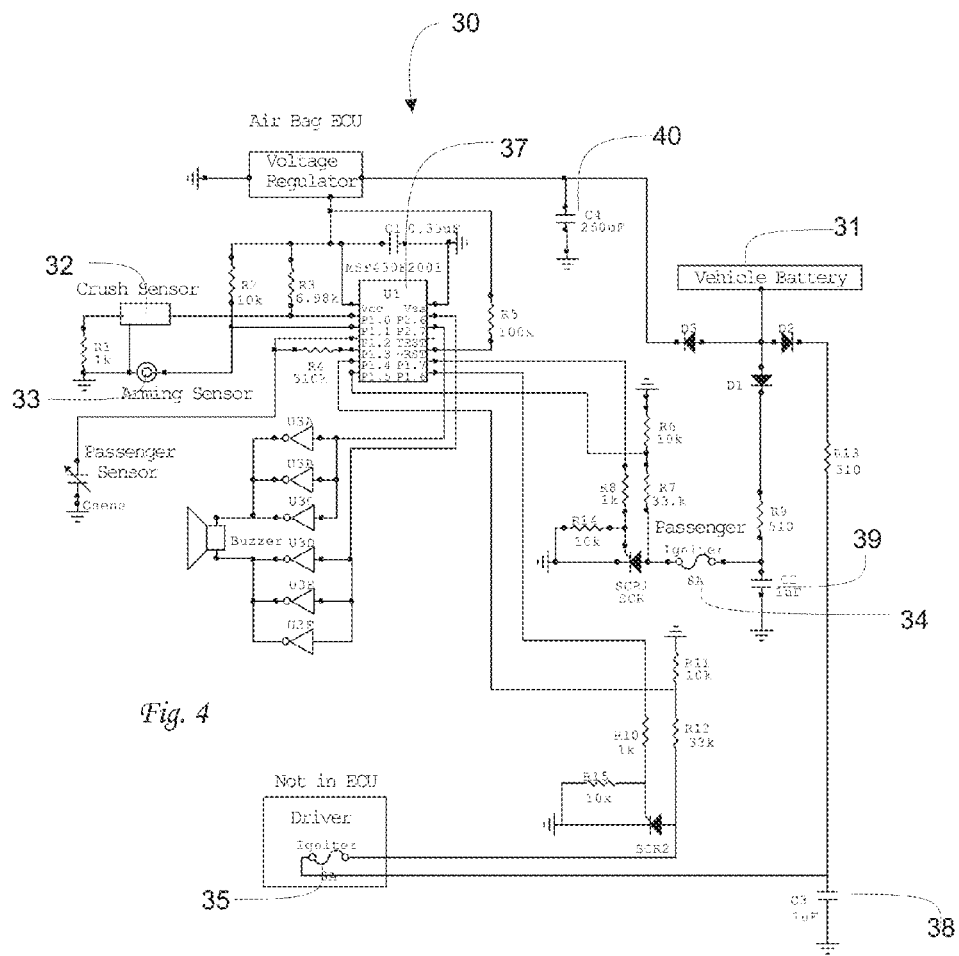
FIG. 4 is a system circuit schematic for an airbag system controller that can be a part of the invention.

A circuit schematic for one example of a simple low cost airbag system circuit for the driver and passenger airbag systems is illustrated in FIG. 4. The system circuit can reside in a housing which can additionally contain other circuits relative to the passive safety system. It can also house other circuits which may or may not be related, such as circuits related to an occupant sensor system or to an active safety system if present. Other passive safety systems which are not shown can include side airbags, side curtain airbags, knee bolster airbags, seatbelt-mounted airbags, active headrests, and seatbelt pretensioners among others. These circuits, taken individually or in combination, may generally be referred to herein as the airbag system controller or safety system controller, or control circuit, control unit, control system, control arrangement, control module.

Referring to FIG. 4, a control circuit that controls the firing of the driver and passenger airbag systems is shown generally at 30. A vehicle battery 31 supplies power to the system. A crush sensor 32 is mounted in a frontal crush zone of the vehicle and detects whether the vehicle has crushed sufficiently in an accident to warrant triggering of one or more of the airbags and is a switch closure input to the circuit 30. In a similar manner, an arming sensor 33 also provides a switch closure to the circuit 30. Both sensor switches are required to close to deploy the airbags or other passive restraint devices. In contrast to earlier systems, the closures do not need to overlap as long as both sensors 32, 33 close during an accident relevant time period, such as about 100 milliseconds. This permits a simple arming sensor to be used which may only provide a closure of less than 1 millisecond which may occur before the crush sensor 32 closes or after it has become disconnected from the circuit 30 due to crash damage. If a processor 37 has determined that both sensors 32 and 33 have closed, current is sent to both a passenger airbag inflator igniter 34 and a driver airbag inflator igniter 35 and both airbags deploy.

Processor 37 also can perform minimal diagnostics on key on, for example, to check for an open or shorted crush sensor 32, an open passenger airbag inflator igniter 34, an open driver airbag inflator igniter 35, a shorted arming sensor 33, the voltage on backup capacitor power supplies 38, 39, 40 for the driver airbag, passenger airbag and processor 37 and the status of the seat occupancy sensor or switch if present. If an unexpected condition is found, a buzzer, or alternately a warning light, can be activated using any convenient code to indicate to the operator the nature of the fault. Also, a record of the fault can be stored in memory associated with the processor 37 or at some other convenient location. Although not shown in FIG. 4, an electronic crash sensor system can be used along with or in place of the crush sensor 32. Such an electronic crash sensor system will be described below and can consist of one or more forward crush zone mounted accelerometers, a MEMS single or dual axis accelerometer or an IMU mounted within the ECU or at some other convenient mounting location. A GPS receiver can be used along with the electronic crash sensor system to correct for the errors in the accelerometers and gyroscopes. Such a correction system can make use of a Kalman filter as is known in the navigation art but is believed to be novel to the crash sensor art. Previously, MEMS accelerometers needed to be continuously self-tested in order to correct for errors due to temperature and time related drifts within the accelerometers. Thus, the GPS-Kalman filter approach described here significantly simplifies the hardware, circuits and software needed for MEMS-based crash sensors.

Figure 5:
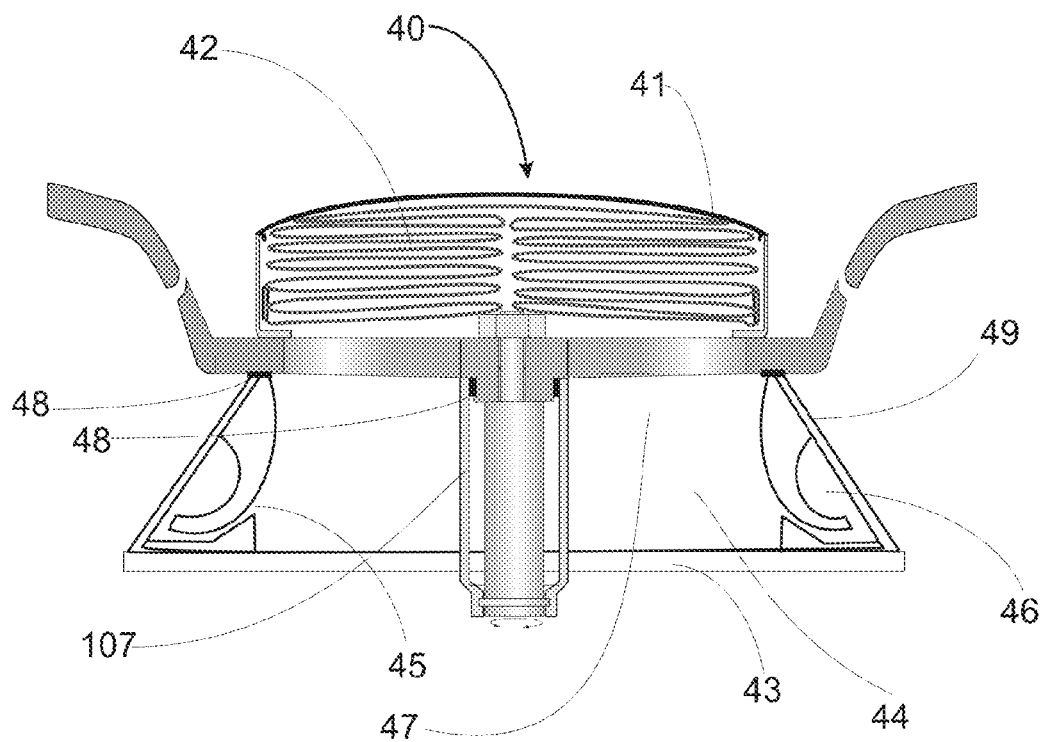
FIG. 5 is a view of a driver airbag module with an aspirated inflator.

An aspiration arrangement similar to the one discussed above with reference to FIG. 3 is illustrated generally at 40 in FIG. 5 for the driver airbag module. Aspiration arrangement 40 comprises a housing 49, airbag cover 41, airbag 42 and aspiration valve assembly 43. The valve assembly 43 is not illustrated in detail in this drawing but can consist of a flexible material positioned against a screen. When a pressure differential occurs across the flexible material due to a drop in pressure within the housing, the flexible material deforms and rests against a housing retainer 107 to permit air to flow from the passenger compartment into the airbag 42. Gas is fed into the aspiration section including the aspiration valve assembly 43 from a combustion module, not shown, into channel 46. High-pressure gas from channel 46 flows through restrictor 45 into a converging nozzle 44 where it mixes with and draws in gas from the passenger compartment through the aspiration valve assembly 43. Somewhat after the converging nozzle 44, the mixed gas enters a diverging nozzle 47 and then passes into and inflates the airbag 42. Bearing pads and seals 48 can be made of an appropriate material such as felt to allow rotation of the steering wheel relative to the inflator while minimizing the leakage of gas from the inflator to the atmosphere.

Figures 5A, 5B:
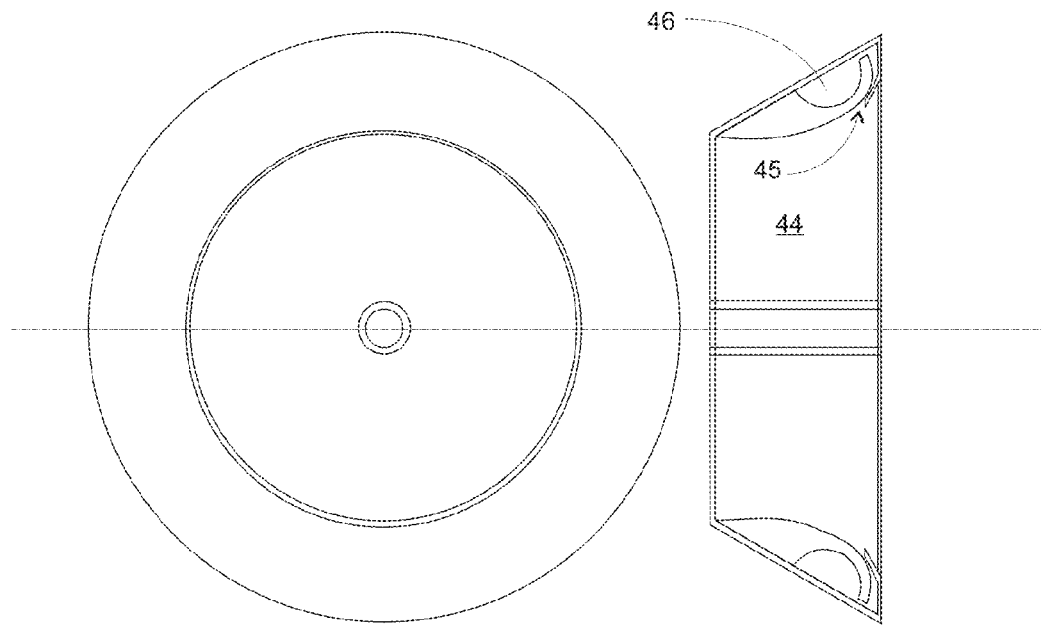
FIGS. 5A and 5B are details of the aspirator designs of a preferred implementation of the driver inflator system of FIG. 5 which results in an aspiration ratio of about 3.5.

FIGS. 5A and 5B illustrate the geometry of a preferred driver inflator which yields a pumping ratio of about 3.5. Substantially all of the parts which make up the aspirated inflator are made from reinforced plastic. The aspiration system maintains the assembly cool during operation. Slight erosion of the plastic can occur in the areas of the restrictor and some metal shielding may be necessary. This shielding can be insert-molded into the plastic during the molding operation.

Figure 6:
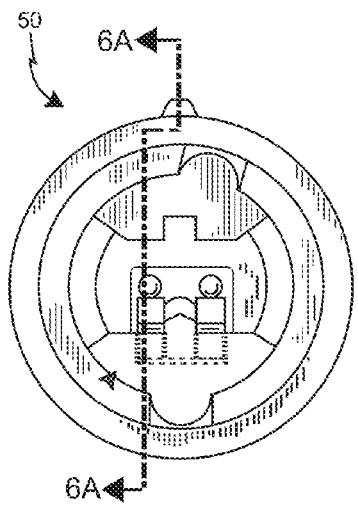
FIG. 6 is a view of a prior art seatbelt retractor gas generator detail and FIG. 6A is a cross section view taken along line 6A-6A in FIG. 6.
Figure 6A:
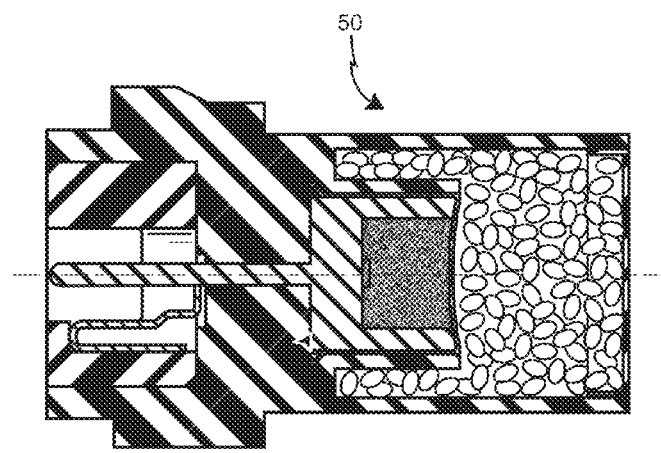

In one preferred implementation, when combustion of the propellant is initiated, as discussed below, a small about of high pressure and high temperature gas, such as created when substantially pure BKNO3 is burned, enters the channel 46 and then passes into restrictor 45 and into the converging and diverging nozzles 44 and 47 respectively. This very high pressure and temperature gas has very low density and thus flows rapidly into where it places a high pressure on the front of the airbag and the airbag cover 41 causing the cover 41 to be released and the airbag 42 to begin initial deployment. This process lasts for a very short time, from less than one to a few milliseconds, and occurs prior to the opening of the aspiration valve assembly 43. This initiation process causes the cover 41 to be released and the airbag 42 to begin to deploy. After a very short time period, the gas cools sufficiently to condense and create a vacuum in the airbag 42 as well as in the various nozzles 47 and 44. This then causes the aspiration valve assembly 43 to open and helps to start the aspiration process. By this time, the gas from the burning main propellant as begun to flow through channel 46 and restrictor 45 into converging nozzle 44. The gas from the main propellant then mixes with the gas from the atmosphere and the mixed gas inflates the airbag 42. By this process, aspiration rates exceeding 3 parts air from the passenger compartment to one part gas from the propellant can be achieved. Alternatively, the BKNO$_3$ can be eliminated at the expense of additional propellant and a lower overall pumping ratio, A prior art gas generator 50 is illustrated in FIGS. 6 and 6A. This generator is described in U.S. Pat. No. 6,553,914. This and similar generators have previously been used with nitrocellulose and other single, double and triple base propellants only for seatbelt pretensioners due to the significant amounts of carbon dioxide generated which, if used for the driver and passenger airbags, could be toxic for humans if breathed for an extensive time period. In the inventions described herein, however, this type of generator can be used since most of the gas used to inflate the airbags is air which comes through aspiration from the passenger compartment and thus relatively little carbon dioxide is released into the passenger compartment from the airbags.

Figure 7:
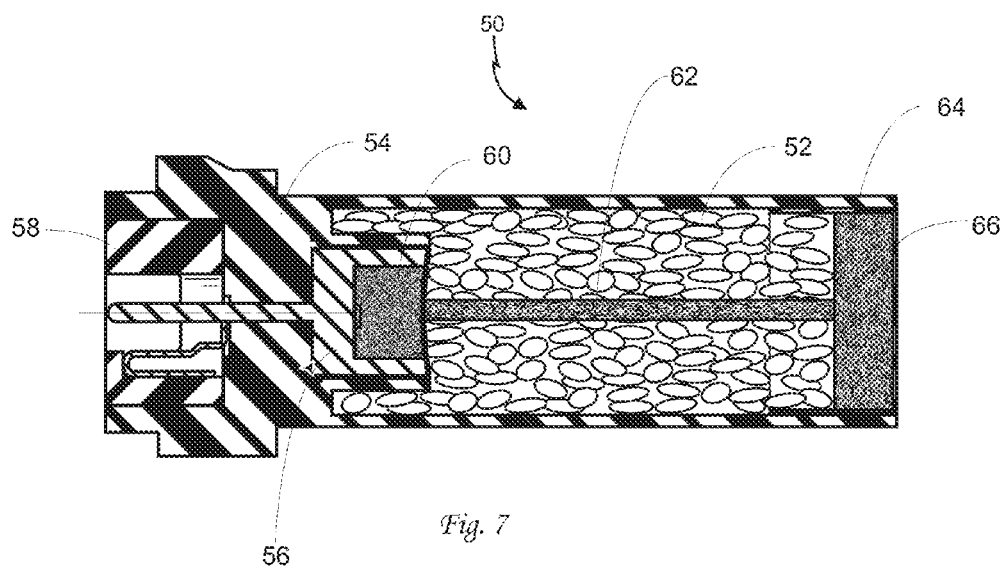
FIG. 7 is a view of one embodiment of a gas generator cartridge for use with the aspirated inflators of this invention.

A modification of the prior art gas generator illustrated in FIGS. 6 and 6A for use with an aspirated driver and passenger airbag is illustrated in FIG. 7. The quantity of gas generating material 52 and thus the geometry, overall size and particularly the length of a gas generator cartridge 50 will vary from vehicle to vehicle, depending of the sizes of the airbags used, and whether it is for the driver or passenger airbag. The gas generator cartridge 50 contains a hermetically sealed igniter 56, containing igniter propellant 60, which is molded into a cartridge housing 54 as discussed in the '914 patent. A coupler 58 connects the cartridge housing 54 to an initiation circuit, not shown. When the igniter 56 is initiated, it begins igniting the propellant 52 and a column of a fast burning igniter propellant 62 which rapidly carries the combustion to a disk of igniter propellant 64, such as BKNO3, to the front of the cartridge where it creates the gas that can be the first gas that enters the aspirator, after passing through a perforated side panel 66 of the cartridge housing 54. This gas burns very fast and very hot but due to its small quantity, typically 1-3 grams, it has little total thermal energy and causes only superficial damage to the parts of the aspirator and later the airbag.

When this gas enters the airbag, it creates a high pressure for a very short time but sufficient to pop off the airbag cover and begin deployment of the airbag. Immediately after it enters the airbag, it cools and condenses and creates a partial vacuum which aids in the opening of the aspiration valve and initiating the aspiration.

Figure 8:
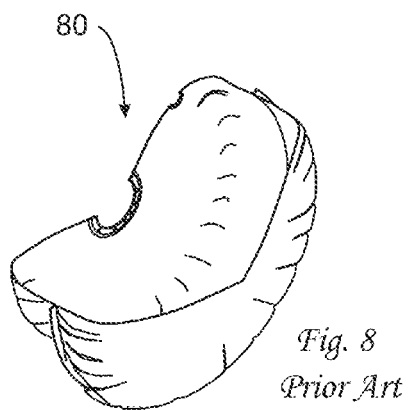
FIG. 8 is an illustration of a prior art driver airbag made from woven film and FIGS. 8A-8E are prior art illustrations of the woven film material forming the airbag of FIG. 8.
Figure 8A:
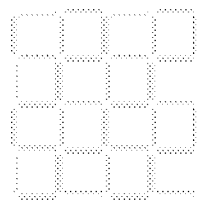
Figure 8B:
Figure 8C:
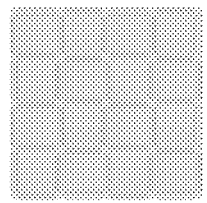
Figure 8E:
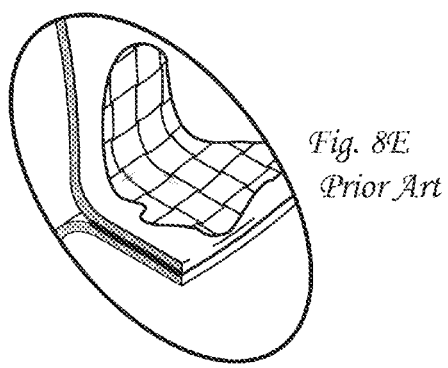
Figure 8D:
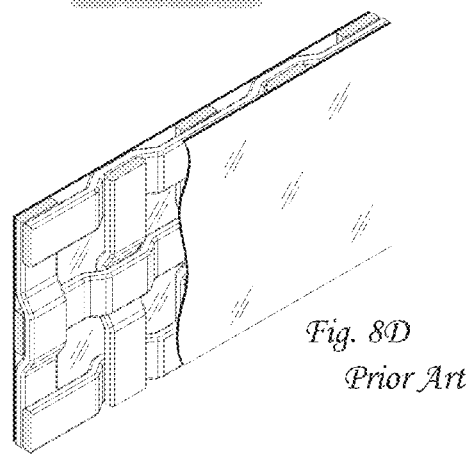
Figure 8F:
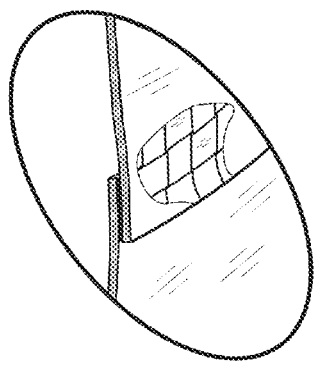
FIGS. 8F, 8G, 8H and 8I illustrate alternative methods of making the seam of FIG. 8E.
Figure 8G:
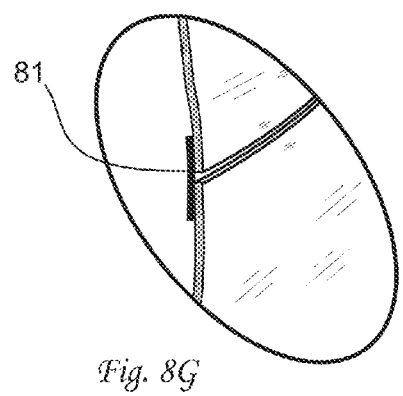
Figure 8H:
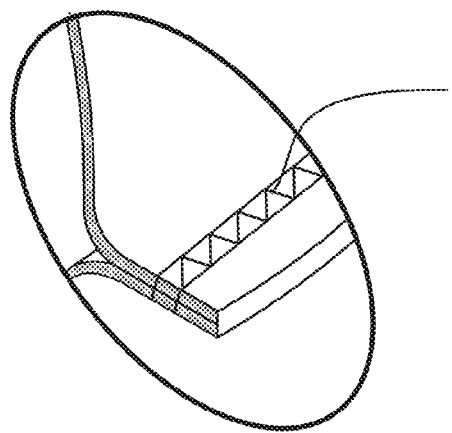

A tetherless driver airbag constructed according to the teaching of this invention is shown generally at 80 in FIG. 8. The film materials that can be used in airbag systems of this invention are disclosed in U.S. Pat. No. 5,653,464 and the woven film material is disclosed in U.S. Pat. No. 7,820,566. FIGS. 8A-8D illustrate various features of the woven film material as illustrated and discussed in the '566 patent. FIG. 8F illustrates an alternate method of constructing a seam which can be useful in some applications where, instead of the lap joint of FIG. 8E, a shear joint is used. In this case, the layers of material to be joined can be either sewn, heat-sealed or adhesive-sealed together, or a combination of sewing and heat or adhesive sealing, to form the seam. An alternative method is to heat or adhesive seal a tape 81 across the two layers which now can be butted to each other as shown in FIG. 8G. The seams of FIGS. 8F and 8G can, in some cases, provide for a stronger joint depending on the elastic properties of the adhesive used. FIG. 8H illustrates the use of stitching 82 for the seam. Stitching for previous versions of woven film airbags, such as described in U.S. Pat. No. 7,820,566, was found not to be always feasible since due to the wide ribbons used, typically 0.1 inches, the seam pulled apart at low force. As taught herein, on the other hand, when the ribbon width is substantially reduced to about 0.01 inches, for example, it was found that the seam strength increased to about 80% of the strength of the material.

A preferred width range of each ribbon is from about 0.01 and about 0.1 inches and a preferred thickness of each ribbon is between about 0.001 inches and about 0.006 inches. The ribbons used in a single airbag do not have to be uniform, i.e., have the same width and thickness, and different ribbons may be used in a single airbag, each ribbon having a thickness and width within the preferred ranges.

The seam strength increase resulting from the substantial reduction in ribbon width was a surprising and unexpected result from using these ribbons. Sewing also is not generally used, presumably for the same reason, on standard woven film tarps where heat or adhesive sealing is used to form the edge seams. When heat or adhesive sealing was used on woven film airbags such as illustrated in FIG. 8E, the strength of the seam also did not match the material strength. Either the heat sealing layers separated from themselves, the heat sealing layer separated from the woven film or the woven film material was weakened by the heat sealing process. It is very desirable for the seams to be at least as strong as the woven film material; otherwise, the thickness of the woven film material needs to be increased which increases the cost, weight and packaging volume on the airbag.

Figure 8I:
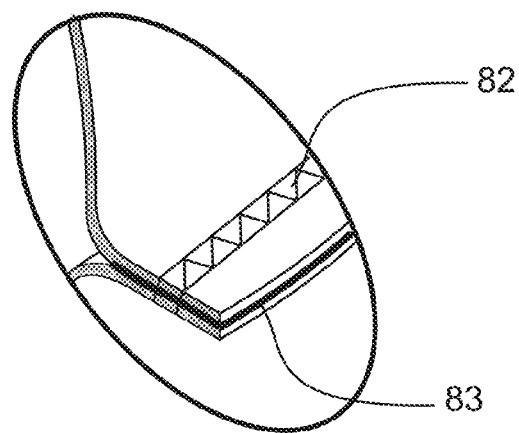

FIG. 8I illustrates combined use of heat or adhesive sealing, 83, with sewing 82 to achieve a seam that is stronger than the woven film material. The combination of heat sealing and sewing has been used in the past with standard fabric side curtain airbags but for the purpose of making the sewn seams so that they do not leak. For this purpose, a rather weak silicone material was used for the seam and it was designed so that it would fail before the airbag material. Thus, the property where the material was stronger than the seam was desired for this side curtain product. This is just the opposite case from what is the intention here and this solution solves a very important limitation for woven film airbags whereby neither heat sealing nor sewing provides sufficient seam strength.

Thus, a preferred method is to use the lap joint of FIG. 8E with a sewn seam as used in conventional airbag designs. By using very narrow ribbons of from about 0.005 inches to about 0.02 inches to create the airbag, it has been found that a pure sewn seam can achieve up to about 80% of the maternal strength. When the ribbons were about 0.1 inch wide, only about 40% of the material strength was achieved. This surprising result was achieved at very little cost penalty and is a key discovery of this invention over the invention of the '566 patent. By adding a small amount of adhesive or heat sealing to the joint, in addition to the sewing, or by innovative sewing techniques such as folding over the material at the seam or by adding one or more additional layers of material at the seams, 100% of the material strength can be achieved by the seams.

Repeating, it is very difficult to achieve a strong, high quality seam using heat or adhesive sealing alone since there are three failure modes. The woven film airbag has a very thin coating, typically from about 0.0001 to about 0.0005 inches, to hold the ribbons together and this coating can separate from the ribbons under stress. For heat or adhesive sealing, another layer of material is added to the seam which has a lower melting point in the case of heat sealing than the woven film material. This added material can fail to adhere to the coating on the woven film. Finally, in the case of heat sealing, in particular the woven film can be locally damaged if the temperature is too high. If the temperature is applied for too long a time, then the film molecules can begin to change their orientation and the film weakened. The inability to sew the previous woven film airbag materials was thus an important factor limiting their use.

Figure 9:
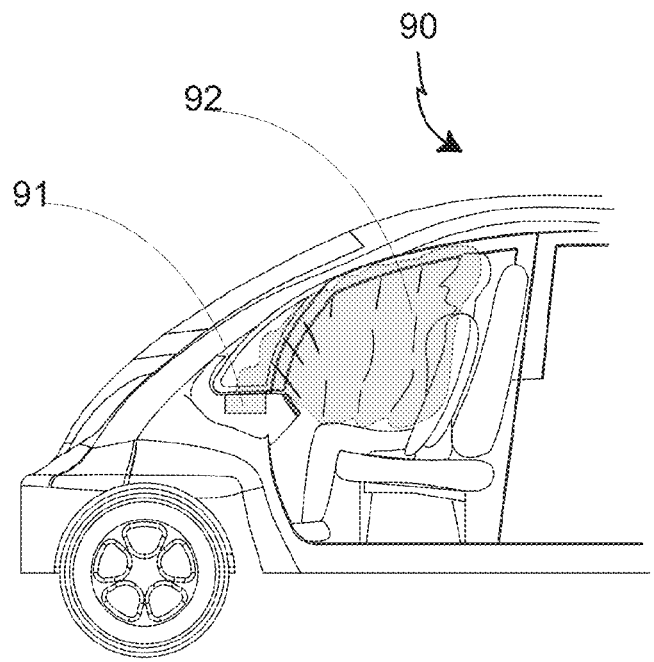
FIG. 9 is an illustration of a passenger airbag constructed according to the similar principles as the driver airbag of FIG. 8.

The passenger airbag constructed in accordance with the teachings of the invention is illustrated at 90 in FIG. 9. An associated airbag module 91 contains the airbag which is shown in the inflated state at 92.

Figure 10:
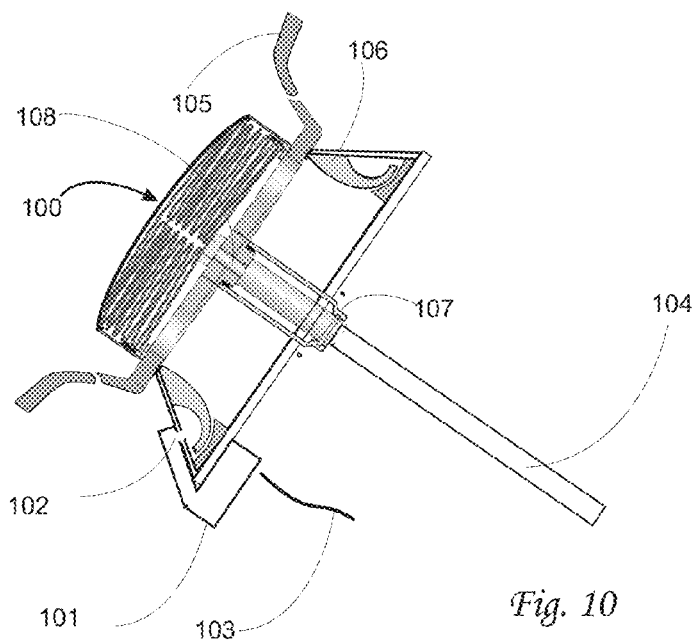
FIG. 10 is an illustration of a driver airbag module and steering column assembly removed from the vehicle.

Looking now at the driver airbag system as shown generally at 100 in FIG. 10. The inflator cartridge of FIG. 7 is shown generally as 101 in FIG. 10 and is mounted to an aspiration system 106 as described above. The aspiration system 106 is mounted to a steering column 104 by an appropriate tube 107 so that it does not rotate with a steering wheel 105. The inflator comprises a combustion cartridge 101 which exhausts into the aspiration system 106 through duct 102. A wire 103 connects the cartridge 101 to the airbag ECU (not shown). In this manner, an expensive clock spring connection cable used in conventional airbag systems is not required, significantly reducing the cost of the airbag system 101.

The steering wheel 105 is mounted to a steering shaft 108 which is rotatably mounted inside the steering column 104.

Figure 11:
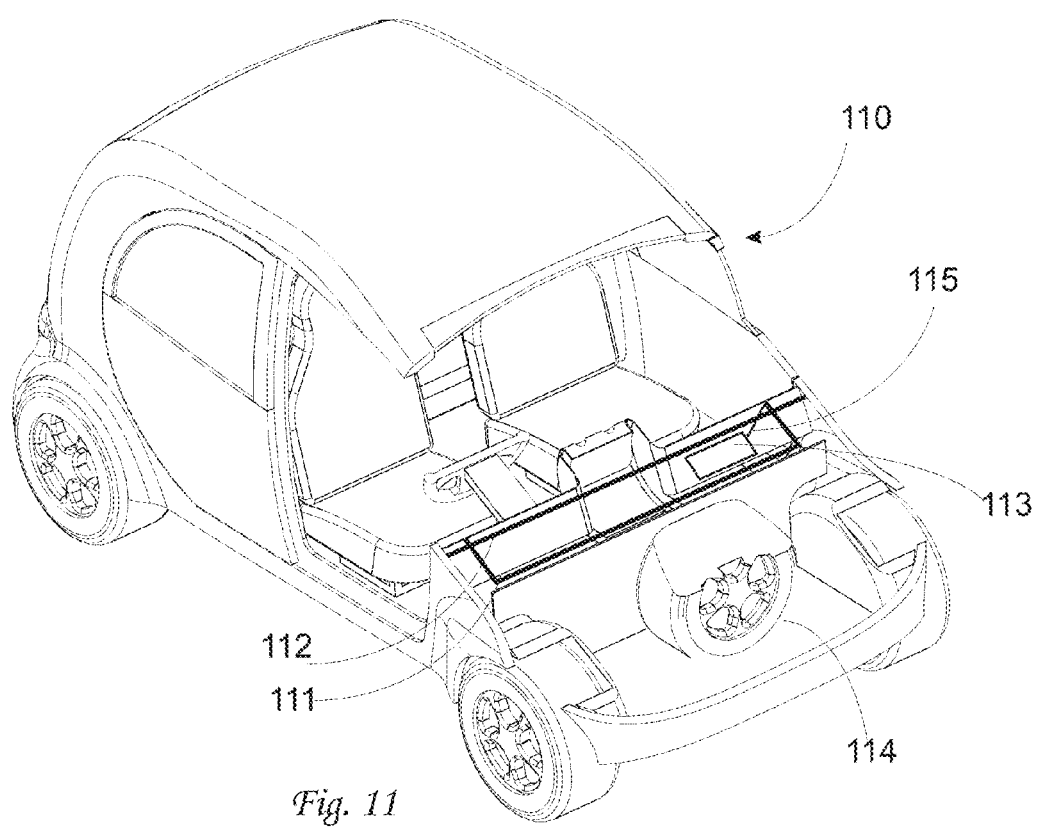
FIG. 11 is an illustration of a vehicle which has been cutaway to show a preferred crush sensor mounting arrangement.

A low cost vehicle, such as the Tata Nano, is illustrated in FIG. 11 with a portion of the front of the vehicle cut away and removed and showing a preferred mounting of a crush sensor. A crush sensor 111 can be positioned on a ledge behind and near the top of a spare tire 114 in the front of the vehicle. The location was chosen so that the crush sensor 111 bends sufficiently to close the contacts, the rod and tube, on a frontal crash into a barrier from any angle between zero and 30 degrees at a crash velocity of no less than 8 MPH and with an all fire of 15 MPH. Positioning and shape of the crush sensor 111 will vary for different vehicle models and in accordance with the requirements of the particular vehicle manufacturer and the country of use. Details of how a crush sensor 111 of this type is designed and mounted are discussed in various commonly owned patents referenced above and in particular U.S. Pat. Nos. 5,441,301, 6,206,129 and 6,328,126.

Crush sensor 111 can be rigidly mounted onto a structural member of the vehicle 112 such that the crush sensor 111 bends and initiates closure before there is substantial deformation of the structural member 112. A wire 115 from the crush sensor 111 leads to the airbag system ECU located within a module 113. This module 113 can be part of the passenger airbag module.

On some occasions, one or more of the discriminating sensors falsely indicate that a crash is in progress and in such cases, deployment of the airbag is not desired. This can happen with a crush sensing crash sensor if the tube becomes bent during maintenance or due to some other action and the rod shorts out against the tube. To guard against this causing airbag deployment, the ECU requires that in addition to the crush sensor closing, an arming sensor (sometimes referred as a safing sensor) must indicate that the vehicle as a whole is decelerating at a level such as above 1 G which can only occur during an accident. A requirement can be set via the ECU software such that both sensors must close within 100 to 500 milliseconds of each other for the airbags to deploy. Thus, if the crush sensor 111 has inadvertently closed and then the arming sensor closes 1 hour later, for example, the airbag will not deploy and a fault indication will occur.

As mentioned below, the arming function can be performed by an IMU if such a device is present. If an IMU or other electronic accelerometer is not present, then a simple pendulum based sensor such as is shown in FIGS. 12A and 12B can be used. Such a device can be attached by solder or other appropriate method to a printed circuit board housed within the airbag ECU by pins 133 and 134. One preferred implementation of the device is shown at 120 in FIG. 12A and comprises a sensing mass 121 in a housing 127. During a crash, sensing mass 121 moves to the right in the drawing causing conductor 126 to move from an insulator or insulating surface 125 toward conducting surface 135 of plug 122. Plug 122 is electrically connected to conductive pin 134. If the acceleration experienced by the sensor is of a sufficient magnitude and duration, typically equivalent to about 1 mph velocity change over 10 to 20 milliseconds, conductor 126 will make contact with conducting surface 135 completing the circuit between pins 133 and 134. Sensing mass 121 can continue moving to the right after contact has been made providing some duration to the contact closure. The ECU will record that contact has been made even for sub-millisecond contact durations and if the crush sensor has also indicated that a crash is in progress then the airbags will deploy. The two crash indicating sensors must close their contacts typically within a time period of typically 20 to 100 milliseconds or the ECU will conclude that there is no crash and that the crush sensor has been inadvertently shorted. In that case, the ECU will suppress the deployment of the airbags and indicate a fault condition.

A slightly different configuration of the arming sensor is shown in FIG. 12B at 130. In this case, the sensing mass 131 is made from a non-conducting material, or has a non-conducting coating, and when at rest, it is in contact with conductive housing 128. Upon sensing sufficient acceleration for a sufficient time period indicative of a crash, contact 129 contacts housing 128 completing the circuit between pins 133 and 134 and sending a crash-in-progress signal to the ECU (not shown) in the manner described above. Another approach is for the arming sensor to be always closed and to open during a crash. In that case, the insulator 125 of FIG. 12A need not be present and the sensing mass 131 of FIG. 12B can be conductive. In both cases, the sensor design is simplified.

In some cases, the vehicle manufacturer may incorporate an occupant sensor to sense the presence of an occupant in the passenger seat of the vehicle and to suppress the airbag if the seat is unoccupied. A more sophisticated version of such a sensor can be used to classify the occupancy of the seat and suppress the airbag if the seat is not occupied by a human above a threshold size or weight. An even more sophisticated version can monitor the health and fatigue state of the driver or passenger. As mentioned above, a simple camera system can perform some of these functions and additionally determine whether the occupant is so close to the airbag that he or she is more likely to be injured by the airbag than by the crash without the airbag. Out-of-position occupant injury is much less of an issue for the systems employing aspirated inflators as described herein.

One example of an occupant presence sensor that performs some classification but does not perform position sensing is illustrated in FIG. 13. A vehicle seat is shown generally at 140 and comprises a seat bottom 141 and seatback 142 into which conductive mats 143 and 144 are embedded. Mats 143 and 144 form the plates of a simple capacitor or electric field sensor which can be coupled by the presence of a dielectric material, such as a human occupant, that is placed over the mats 143, 144. A practical implementation could use multiple plates or antennas as would be understood by one skilled in the art and will not be described here. The antennas are controlled by an ECU 145 which can be mounted as part of the vehicle seat or elsewhere. For a description of this technology, see U.S. provisional patent application Ser. No. 61/452,469 filed Mar. 14, 2011, now expired.

It will be appreciated that a large person sitting on the seat will cover a larger part of the seat and have a greater effect on the current to the capacitor plates than for a smaller person. A smaller person setting on the seat will cover a smaller area so the effect will be less. The cost of the mats 143, 144 and a microprocessor to measure the capacity in large quantities can be lower than the price of a camera. The ECU 145 described above preferably uses a MSP430F2001 which also is capable of measuring the current in the occupant sensing electric field sensor. Thus, to add this capability only the cost of the mats and wiring need be considered. This device can also be used to discriminate between a small child and an adult though probably not as accurately as by using a weight sensor. The device can also be used to measure the health and fatigue state of the driver, for example, and can facilitate the use of wireless switches and touch pads as described below and in the '469 application.

A simple weight sensing system can be used by placing strain gages or other force or displacement monitoring sensors on or in conjunction with the bolts that attached the seat to the support and seat adjustment rails. Such a system is described in U.S. Pat. Nos. 7,766,383 and 7,421,321, incorporated by reference herein. Alternately, a simpler system can use a spring and micro-switch in the seat supports which will provide a minimal discrimination based on occupant weight. If the spring switch system is set to allow deployment if at least one of the switches closes, and each is set to close at 50 pounds, then regardless of where the occupant is sitting and if his or her weight exceeds 100 pounds, at least one switch will close. Since the occupant might move forward or back in the vehicle, the system should latch for an appropriate time period. A more sophisticated strain gage weight sensing system is disclosed in U.S. Pat. No. 7,243,945.

Figure 14A:
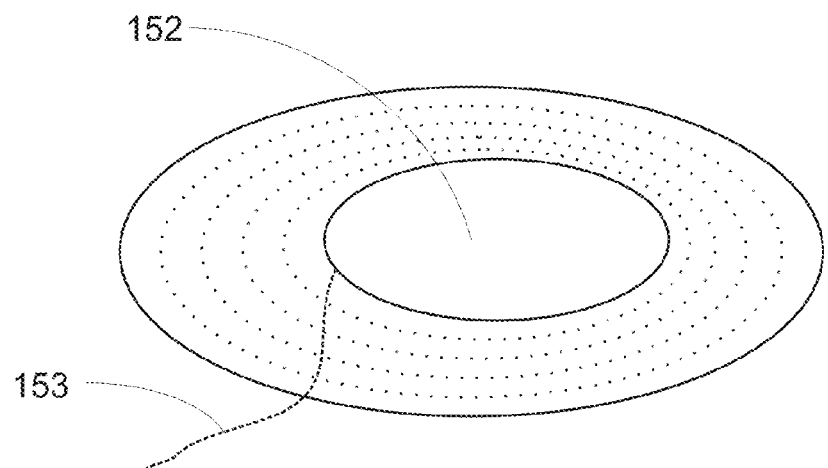
FIG. 14 is an illustration of a pop-off driver airbag module cover and FIG. 14A is a top view of the cover of FIG. 14 with an added horn or touch pad.
Figure 14:
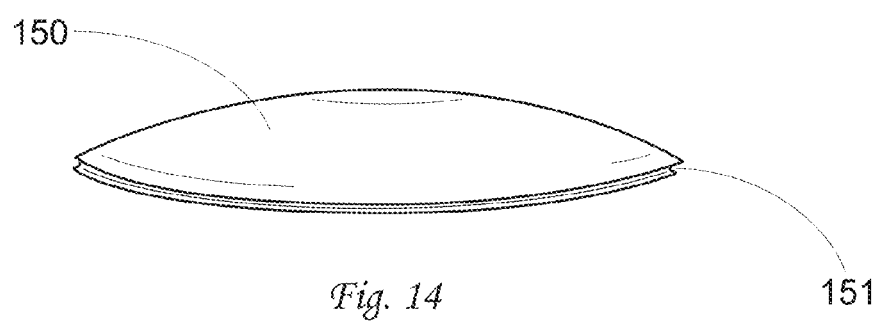

A perspective view of the cover for the driver airbag module is shown at 150 in FIG. 14. Cover 150 can be made from polycarbonate having a thickness of between about 0.010 and about 0.030 inches. Other appropriate materials can be used for the cover such as TPO (Thermoplastic PolyOlefin) with some weight and injury potential penalty. Cover 150 can have a groove 151 which mates with a corresponding lip in the airbag module and is designed such that when pressure is applied to the cover by the airbag, the groove 151 is withdrawn from its mating lip in the airbag module and the cover pops off of the module. The cover 150 can be attached to the module by a strap, not shown, or other method to prevent the cover 150 from being projected at the occupant.

The cover 150 can also comprise a pad 152 in the center, or elsewhere, which can, at a minimum, provide a horn pad. The pad can be connected to appropriate circuitry by a wire 153. If the pad is a conductive surface applied to the cover 150, then contact by the driver can be determined capacitively. As an alternative, a separate pad can be attached to the cover 150 and separated therefrom by its shape or by foam or other method such that a depression of the surface causes two conducting surfaces to connect thereby closing a switch. A more sophisticated alternative is to make the pad 152 into a touch pad where the position of the finger of a driver can be measured and used to control a display, for example, or other device much like the touch pad on a laptop computer. If the perimeter of the pad 152 contains four conductive sections, for example, and the electric field pads are used as in FIG. 13, then the position of the finger can be determined and desired functions implemented. The option space is enormous and no attempt will be made here to cover it. The invention here is primarily to provide a simple switch or touch pad function in conjunction with a thin airbag cover for interacting with or controlling another vehicle component.

Figure 15:
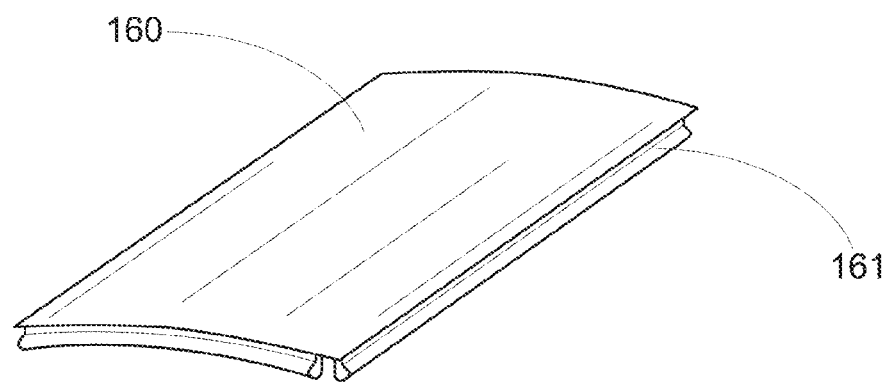
FIG. 15 is an illustration of a pop-off passenger airbag module cover.

A perspective view of the cover for the passenger airbag module is shown at 160 in FIG. 15. As in the driver module, the cover 160 can also be made from polycarbonate having a thickness of between about 0.010 and about 0.030 inches, or other material such as TPO, and has a similar groove 161 for facilitating a pop-off arrangement when the airbag begins to be pressurized. Although not shown, a touch pad device can also be incorporated in conjunction with this cover 160 in order to make efficient use of the area otherwise taken up by the airbag module.

Figure 16A:
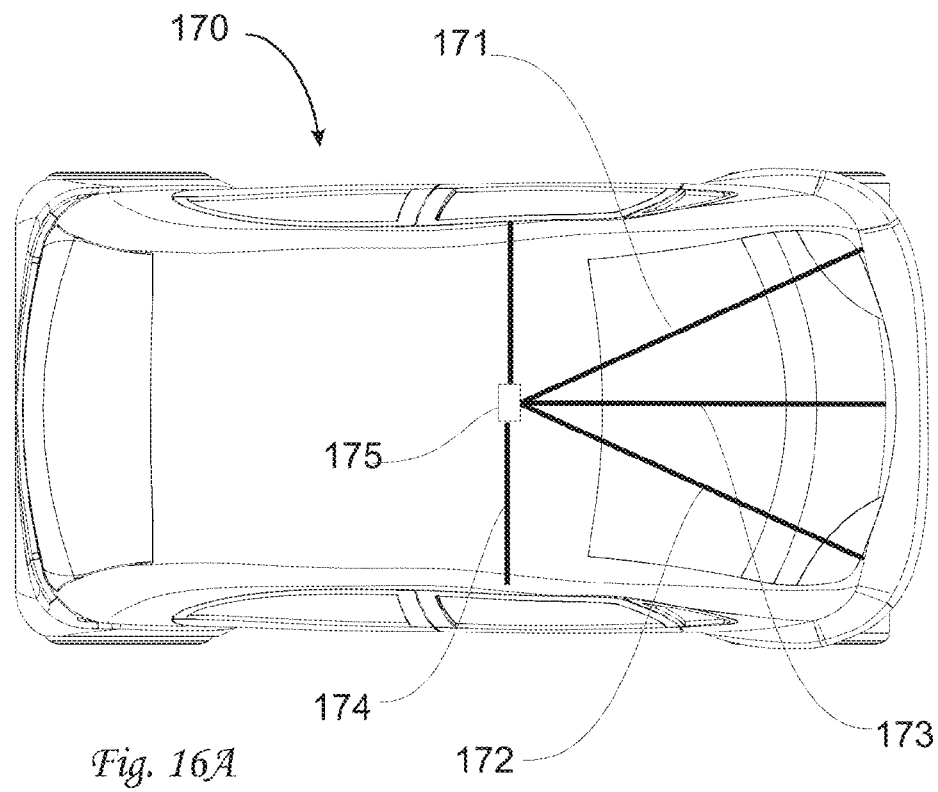
FIGS. 16A and 16B illustrate the single point sensor option using an IMU with FIG. 16A illustrating stiff members connecting the sensors to the vehicle front and side crush zones and 16B illustrating the placement of a MEMS accelerometer or an IMU single point sensor where stiff connecting members are not used for frontal impact sensing.

In another embodiment of a very low cost airbag system, the frontal airbag system can be triggered by a centrally-mounted crash sensor. This crash sensor can be in the form of an inertial measurement unit (IMU) or of a single axis or biaxial MEMS accelerometer either of which is illustrated generally in FIGS. 16A and 16B at 170. The IMU or a single or dual axial accelerometer can be mounted onto a structural member and can be attached to the front of the vehicle by members 171, 172, and 173 and to the sides of the vehicle by members 174. The members 171-174 are rigidly attached to the crush zones of the vehicle and during a crash, they transfer the crash pulse from the crush zone to the IMU 175 so that the IMU 175 experiences the same accelerations that it would experience if it were located at the other ends of the members 171-174. In some cases, these members 171-174 can be part of the vehicle structure as long as they transfer the accelerations to the IMU 175 during the first few milliseconds of the crash and not to the vehicle as a whole so that the IMU 175 can change its velocity relatively independent of the vehicle body or frame. By this technique, a single IMU can be used to sense crashes into both the front and the sides of the vehicle.

Figure 16B:
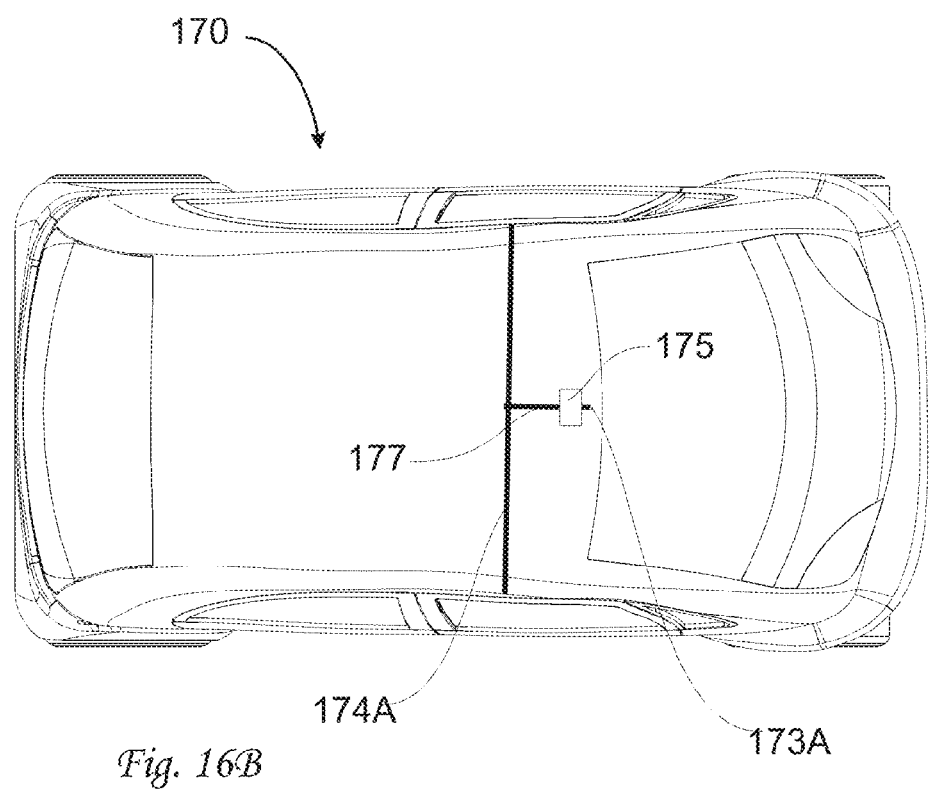

In the implementation illustrated in FIG. 16B, stiff members 174A can act on another stiff member 177 which acts like a lever arm and pivots at attachment point 173A. In this embodiment, the side acceleration that acts on the sensor 175 is reduced by a factor of 10:1, or other appropriate amount, thereby allowing the use of a more sensitive accelerometers in the sensor 175.

When an aspirated inflator is used, as in the preferred implementation of this invention, an out-of-position occupant is unlikely to be injured by the deploying airbag. As soon as the pressure begins to rise due to the airbag interacting with the occupant, the aspiration inflator shuts off and the gas begins to flow out of the venting apparatus which can be the aspirating inflator itself if the aspirating valve is prevented from closing completely. Thus, occupant sensors are in general not required, further reducing the cost of the system. Late sensor deployment when triggered by single point sensors can happen in marginal crashes where the full capacity of the airbag is not required. It can also happen in multiple impacts where the first impact is insufficient to trigger the airbag. Conventional systems on the market today do not take into account either of these cases for the driver and thus the airbag system of this invention is inherently safer than conventional airbag systems now in production. Few production airbag systems today measure the position of the passenger and thus the passenger is at risk when out-of-position. Again, the system of this invention is thus safer than conventional, and much more expensive, passenger airbag systems in production today.

An IMU (inertial measurement unit) is a device that usually contains three accelerometers and three gyroscopes, although various designs can contain differing numbers of such devices, and is available from numerous manufacturers, such as Analog Devices, ST Microelectronics and InvenSense. One novel example is described in U.S. Pat. No. 4,711,125. Such devices are finding increasing use in cell phones and tablet computers, such as the iPhone and iPad. For use for crash and rollover sensing in a vehicle, the range of the accelerometers should be in the 1-200 G range rather than the 0-10 G or less range for use in tablet computers for example. An IMU can be used for non-crush zone crash and rollover sensing if the members 171-174 are not used, in which case, the accelerometer range can be reduced to 1-50 Gs or less. The gyroscopes in both the crush zone and non-crush zone sensing cases can be the same and can be used for rollover sensing. In another implementation, the IMU can be used with the same sensitivity as used in the tablet computers where other discriminatory sensors are used. For example, if a CrushSwitch is used in the crush zone, the IMU can fulfill the functions of sensing rollover and also act as an arming sensor as discussed below. Alternately, the IMU can be rigidly attached to the vehicle structure and a separate tri-axial accelerometer can be attached to members 171-174, in which case, the IMU fulfills the arming and rollover sensing functions.

There are of course many variations to how an IMU can be used in conjunction with acceleration transfer members and other sensors. One other preferred example is to place single axis accelerometers at various locations in the front, side and/or rear crush zones of the vehicle and the IMU in the airbag ECU where it acts as an arming and rollover sensor.

In general, crush zone sensors are used when seatbelt usage cannot be guaranteed. Seatbelt usage in developing countries, such as China and India, is reported to be on the order of 20%. When seatbelts are universally used, then the sensitivity of the crash sensors can be decreased and airbag deployment injuries due to slightly late deployments in soft crashes, for example, are minimized. However, there can still be such airbag-induced injuries to out-of-position occupants. Occupant position sensors can be used to minimize such injuries to out-of-position occupants. The most effective and one of the least expensive of such occupant sensors is a single camera which monitors either the driver or passenger seats or both.

One key advantage of integrating an IMU into a vehicle is that when it is combined with a GPS receiver and a Kalman filter is used, the accuracy of the IMU can be greatly increased. Most low cost IMUs are made using MEMS technology which while low cost suffers from some inherent problems. When the MEMS accelerometers and gyroscopes are micromachined from a single crystal of silicon, for example, there can be residual stresses within the crystal that cause the properties of the device to change with time, temperature, and other environmental factors in an undetermined manner. The devices can be subjected to accelerated ageing, such as heat cycling, for a period and some of the indeterminacies will be reduced. Then, an equation can be derived for each element which relates the device properties to temperature etc. However, a preferred approach when a GPS receiver is present is to periodically analyze the outputs of the IMU and their integrals with the position (location and attitude) of the vehicle as determined from the GPS and then, using a Kalman filter, adjust the constitute equations for each of the devices so that they are internally consistent with each other and agree with the position change as determined from the GPS. By such methods, the accuracy of the IMU can be significantly increased. This technique is generally applicable for the highly sensitive accelerometers, such as those in to less than 1 G to 5 G range. For higher calibration accelerometers, such as used in the crush zone of a vehicle for crash sensing, another technique such as self-testing can be used to improve the accuracy; however, self testing can add cost and complexity to the sensing system. Other sensors can also be employed to improve the IMU accuracy, such as a magnetometer and flux gate compass.

Once an IMU is resident on a vehicle, then other functions, such as electronic stability control, can benefit. Although most IMUs have gyroscopes, an alternate IMU which does not use gyros is discussed in Peng, Y. K. and Golnaraghi, M. F. "A Vector-Based Gyro-Free Inertial Navigation System by Integrating Existing Accelerometer Network", IEEE Position Location and Navigation Symposium, 2004.

The systems described above make use of electrical or electronic crash sensors. The teachings of this invention are also applicable using mechanical sensors and stab primers as disclosed in U.S. Pat. No. 7,481,453.

Figure 17:
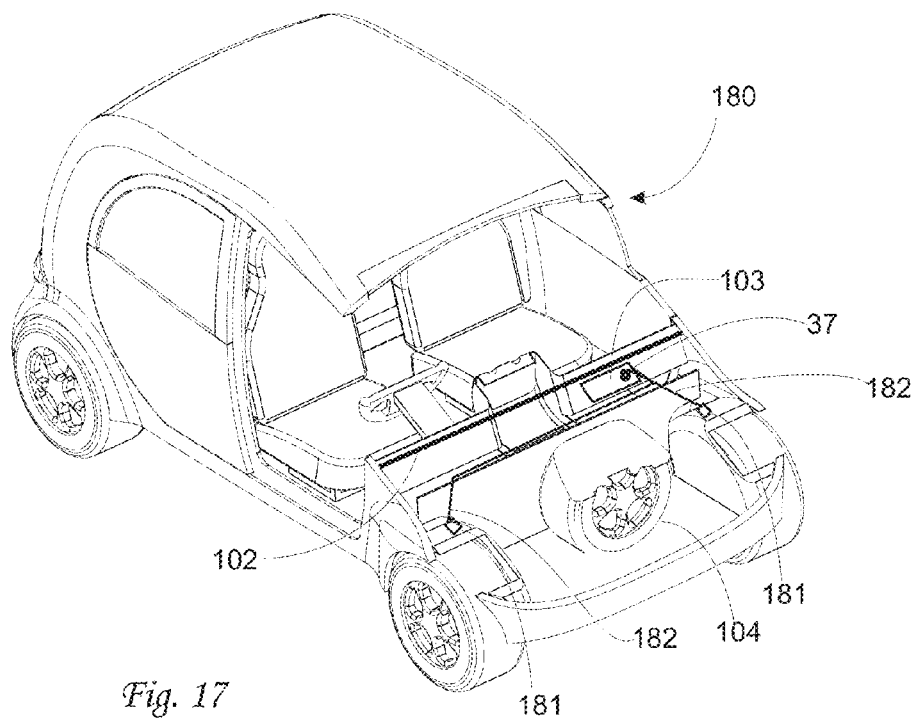
FIG. 17 illustrates an electronic crush zone sensor option.

As discussed above, electronic accelerometers can be used in the crush zone with the low cost airbag system of this invention to sense crashes as is done with conventional airbag systems. This is illustrated generally at 180 in FIG. 17. The measured accelerations from two accelerometer-based crash sensors 181 are converted to digital form, coded based on the accelerometer and fed onto a data bus 182 which is connected to an ECU 37. The ECU 37 processes the data and determines whether the airbags should be deployed. Although two crush zone-mounted accelerometer based sensors are illustrated in FIG. 17, one, three or even more can be used in some applications.

In the case, where the driver and passenger are known to be wearing seatbelts, when it is required by law for example, crush zone sensors may not be required and a single point sensor used. Such a sensor can be made in a manner similar to the arming sensors illustrated in FIG. 12 with a different bias and travel.

Aspirated inflators have an advantage over pure pyrotechnic inflators in that the gas used to inflate the airbag is considerably cooler since 75% or more of the gas that inflates the airbag can come from the passenger compartment. In a similar manner, when aspiration is used with a stored gas inflator, the gas inflating the airbag may not be as cool as the case with a pure stored gas inflator. Even when augmented inflators are used, aspiration results in the temperature of the gas in the airbag being closer to ambient temperature.

Figure 18:
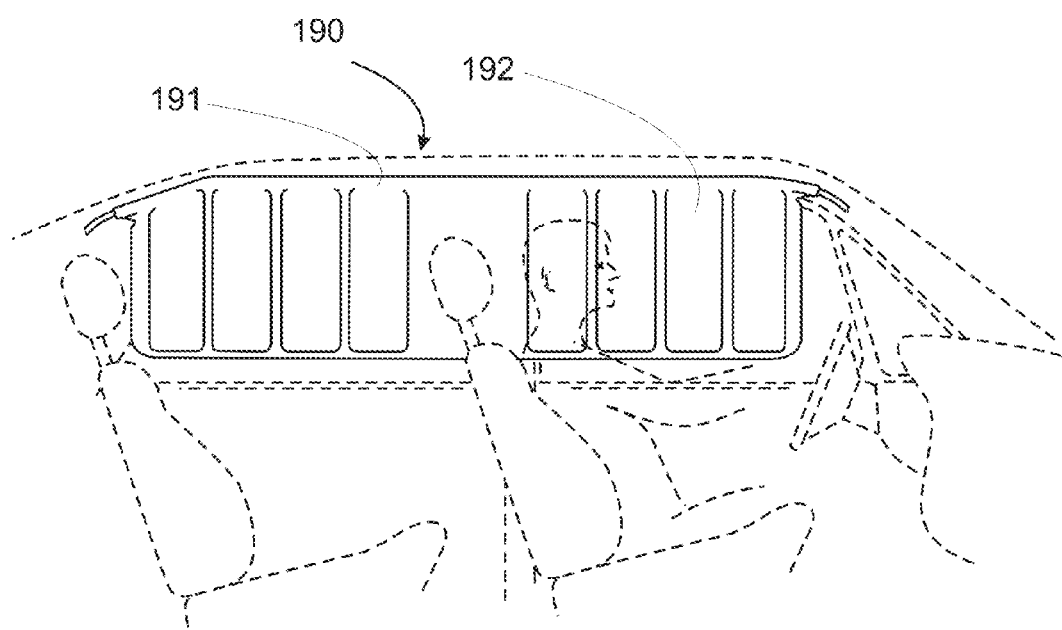
FIG. 18 illustrates use of side curtain airbags.

Finally, the low cost airbag system can be used for side curtain airbags, such as illustrated generally at 190 in FIG. 18, as well as for side airbags which are not shown. Gas from the inflator, which may be aspirated, flows through a passage 191 into chambers 192 in the conventional manner.

Previous aspirated inflator designs, such as disclosed in U.S. Pat. No. 7,762,580 and published U.S. patent application Publ. No. 20130062866, have relied on the Coanda effect wherein the high pressure gas from a gas generator is inserted into the flow stream either perpendicular to the flow channel axis or at a substantial angle pointing mainly toward the center of the flow stream and depends on the presence of a nearby curved wall to cause the high pressure flow to adhere to the wall and thus turn so that it flows downstream. In this process, the inertia of the gas causes the flow to spread and it is this spreading, where some of the gas travels toward the center of the flow, which causes the aspiration of the low pressure gas from the atmosphere. This process causes a substantial amount of the gas which fills the airbag to be aspirated from the passenger compartment. However, as the pressure of the high pressure gas increases, the gas stops following the adjacent wall due to its increased momentum and travels as a jet in the direction that it is aimed. If that direction is perpendicular to the flow path, the aspiration stops and the high pressure jet splits with some going into the airbag and some out to the atmosphere. This effect limits the pressure of the gas generator which can be used to a small percentage of that which is available and thus only a small portion of the available energy can be used. A gas generator can provide gas at a pressure of about 40 atmospheres or more but the Coanda effect ceases if the pressure exceeds about 2 atmospheres.

For this reason, the high pressure gas should be inserted parallel or substantially parallel to the flow path but in that case, it simply adheres to the walls and little aspiration results. This situation can be solved by increasing the length of the flow path and by changing the flow direction as the high pressure gas flows downstream through the addition of flow diverters.

FIG. 19 illustrates a driver side aspirator design showing a steering-wheel mounted airbag aspiration inflator 200 (hereinafter referred to as an aspirator) configured to provide for the insertion of the high pressure (aspirating) gas in a direction parallel or substantially parallel to the flow path of the (lower pressure) air from the passenger compartment. This aspirator 200 may be arranged in a similar manner as the aspirator shown in FIG. 10. A shaft associated with the steering wheel passes through a central cylindrical channel 214 of an aspirator housing 218 and inlet openings 210 defined by the housing 218 at its proximal, inlet end are left in flow communication with the passenger compartment.

Another feature, shown in FIG. 19, is the creation of secondary aspiration. In this case, holes 224 are provided in the flow path walls which are open to the atmosphere, e.g., the outermost wall of the housing 218. Since the flow near the outermost wall is at a high velocity, its pressure perpendicular to the wall is very low. A hole to the atmosphere (ambient atmosphere surrounding the housing 218 which may be defined by the usual spaces in a steering wheel between the outer rim and the inner mounting to the steering wheel shaft as shown in FIG. 10) therefore will cause air to be drawn into the flow in an effect known as secondary aspiration.

In order to get greater mixing, the entire aspirator housing 228 can be lengthened as shown in FIG. 19A. In this case, the outermost wall, innermost wall and interior walls concentric or coaxial therewith may be substantially cylindrical along the entire axial length of the housing 228, i.e., including only a cylindrical portion. Alternatively, the outermost wall, innermost wall and interior walls of the housing 218 may be constructed to provide the housing with a cylindrical portion 230 at the proximate, inlet end and a truncated conical portion 222 at the distal, outlet end (see FIG. 19). This provides an advantageous change in the flow direction along the axial length of the housing 218.

Additionally, flow perturbation bumps, tabs or grooves can be placed on the surfaces of interior walls 208, the inner surface of the outermost wall and the outer surface of the innermost wall, and the three concentric cylindrical flow passages can be separated so as to allow holes, not shown, to be placed in the interior walls 208 to achieve secondary aspiration and also to aid in the mixing process. Note that holes 224 are shown only in the outermost wall, but represent the presence of similar holes in the interior walls 208 and the innermost wall.

In FIG. 19, high pressure gas, for example at about 40 bars pressure from a high pressure gas source (not shown but whose construction, location and integration into the invention would be readily ascertainable by those skilled in the art in view of the disclosure herein), flows into the aspirator 200 through distribution tubes 202 of an aspiration system into a plurality of annular distributors 204 of the aspiration system. One or more tubes 202 are associated with each annular distributor 204, two in the illustrated embodiment at a 180 degree separation. If more than two tubes 202 are associated with one of the annular distributors 204, they may be equally spaced apart from one another (e.g., 3 tubes at a 120 degree spacing).

The tubes 202 leading to the annular distributors 204 associated with the innermost and outermost walls may have a flow diameter half that of the tube(s) 202 leading to the annular distributors 204 associated with the interior walls since there are openings 206 into a mixing section or chamber 216 only on an inner side of the annular distributor 204 associated with the outermost wall and only on an outer side of the annular distributor 204 associated with the innermost wall. By contrast, there are openings 206 from the annular distributor 204 associated with each interior wall on both the inner and outer sides since these annular distributor 204 effectively provide high pressure gas to two adjacent flow passages.

The high pressure, aspirating gas then exits from the annular distributors 204 into the flow mixing section or chamber 216 through the openings 206 in the annular distributors 204 where it begins mixing with ambient gas from the passenger compartment which enters mixing chamber 216 though openings 210 at the inlet of the housing 218. To this end, the annular distributors 204 associated with the interior walls 208 may have a U-shaped cross-section opening toward the distal end of the housing 218, with the interior wall 208 being in an approximate middle to thereby define openings on opposite sides of the interior wall 208. The high pressure gas is thereby distributed all around the flow passages.

The mixed high and low pressure gas then exits though outlet opening 212 of the housing 218 into the airbag (not shown).

The aspirator 200 is attached to the shaft housing via the central channel 214 defined by the innermost wall and does not rotate with the steering wheel (in a similar manner to the aspiration system shown in FIG. 10, details of which are equally applicable to this embodiment unless inconsistent with the remaining features thereof).

Mixing section or chamber 216 includes, in the illustrated embodiment, the three coaxial or concentric cylindrical flow passages defined by the two interior walls 208 and the innermost and outermost walls of the housing 218. The interior walls 208 are spaced apart from the innermost and outermost walls, and each other, and preferably coaxial or concentric with one another. Thus, the chamber has several separated interior portions. In other embodiments, the number of interior walls 208 between the outermost and innermost walls of the housing 218 differs from two, for example, a single wall or three or more walls. Thus, the mixing chamber 216 includes a minimum of two concentric (or coaxial) flow passages. These flow passages are not required to be cylindrical. Indeed, since the illustrated embodiment has a conical portion 222 at the distal end, they are only partly cylindrical b virtue of portion 230. Also, although not preferred, it is possible to have an aspirator housing with only the innermost and outermost walls, i.e., no interior walls.

One or more separation walls 226 are arranged in the housing 218 to separate or partition the flow passages in the mixing chamber 216. As shown, housing 218 includes four separation walls 226, equally spaced around the periphery of the housing 218, to thereby segment the flow passages into quadrants. Each separation wall 226 essentially includes three parts, one in each flow passage of the mixing chamber 216. The separation walls 226 extend in a radial direction along the longitudinal axis of the housing 218 and thereby connect the innermost and outermost walls as well as the interior walls 208. Also, the separation walls 226 may be coupled to the annular distributors 204 to thereby contribute to the coupling of the aspiration system to the housing 218.

One of the primary advantages of using aspirated inflators to inflate airbags, as discussed above, is that the airbag never contains gas at a high pressure and thus when the airbag interacts with an out-of-position occupant, the aspiration stops and the force put on the occupant is limited in such a manner as to not injure the occupant regardless of where he or she is positioned relative to the inflating airbag. One disadvantage of this effect is that the force to break open the airbag cover is also limited. One solution to this problem is discussed above where a pop-off cover is used. This pop-off cover, however, limits the interior design options where the vehicle interior designer frequently desires that the airbag cover be non-observable. This is known as a seamless airbag cover design. Such designs, however, may require more force to open than is available from an aspirated inflator airbag system. This problem for standard airbag systems is discussed at length in U.S. Pat. Nos. 5,217,244, 5,375,875, 5,393,088 and 5,478,106 to Bauer which are incorporated by reference herein in their entirety. The '875 and '088 patents discuss methods of using cutters to cut open the seam and the '244 and '106 patents disclose pyrotechnic methods. Other patents to Bauer, such as U.S. Pat. No. 7,919,036 disclose methods of pre-weakening the cover seam so that the cutter and pyrotechnic systems are not necessary.

Since the deployment door opening problem is more severe for the aspirated inflator system of this invention, in many cases, the cutter and pyrotechnic systems will need to be employed. Since these methods have not generally been used in production airbag systems, and since it may not be possible to sufficiently pre-weaken the airbag cover seams of the deployment door, the cutter and pyrotechnic systems of the Bauer patents now become feasible.

FIGS. 20 and 20A from the '106 Bauer patent illustrates a pyrotechnic system for cutting a hole in the instrument panel to allow the passenger side airbag to deploy under low pressure. The following description is taken from the '106 patent with reference to FIGS. 1 and 1A in that patent:

"... the present invention is concerned with the installation of a stored air bag 10 behind a trim piece 12 located within the passenger compartment of an passenger carrying vehicle. The trim piece 12 shown is comprises an instrument panel having a smoothly extending outer covering skin typically of vinyl plastic which overlies a foam layer 16.

"An instrument panel substrate 18 extends beneath the foam and covering layers 14, 16 and is formed with an opening 20 into which is fit a door substrate panel 22.

"The covering layer 14 which is constructed of a tough plastic such as vinyl and the underlying foam layer 16 overlie the instrument panel substrate 18 and interfit substrate door panel 22 in a smooth uninterrupted expanse such that the presence of the opening 20 and substrate door panel 22 are invisible from the externally instrument panel 12.

"The instrument panel substrate 18 and door substrate panel 22 may be constructed of a suitable strong plastic such as molded polyolefin in the manner well known to those skilled in the art.

"The door substrate panel 22 is generally rectangular" (see FIG. 20A), "... and is free along three sides but hinged along the rear side by having a integral hinge flange 24 secured to an in turned wall 26 of the instrument panel substrate 18, as by means of screws 28 and a retaining plate 30.

"The free sides of the door substrate panel 22 have in-turned portions 32 abutting in the closed position the portions 34 of the instrument panel 18 adjacent the perimeter of the opening 20. This enables door substrate panel 22 to resist inward pushing pressure imposed thereon for the exterior, but is otherwise free to move outwardly to hinge open along the rear integral hinge flange 24.

"The substrate door panel 22 is also provided with suitable stiffening ribs 36 extending from the front to the rear thereof.

"Portions of the instrument panel substrate 18 defining the opening 20 are covered with a metal stiffening frame 38, secured by means of screws 40 and by the screws 28 and retaining plate 30 holding the hinge flange 24, of the door substrate panel 22.

"The metal stiffening frame 38 is desirable for stiffening and stabilizing the instrument panel regions adjacent the opening 20 as described in U.S. application Ser. No. 08/132, 150 filed on Oct. 5, 1993.

"The air bag 10 is mounted within a space 42 defined by a structural panel 44 supporting the instrument panel 18.

"According to the concept of the present invention, a linear element 46 is mounted atop the metal frame 38 and adjacent the opening 20 of the instrument substrate panel 18. The linear element 46 is designed to cause a cutting edge 48 to be driven outwardly so as to penetrate the covering layer 14 in a three sided pattern.

"The linear element 46 is confined between a knee 50 formed in the metal frame 38 and a projecting rib 52 along the sides of the door substrate 22, the rib 52 and knee 50 being inclined towards each other to form a confining channel space 54.

"The linear element 46 is defined by an enclosed shaped tubing 56 containing a pyrotechnic charge 58 such as ITLX 2000 linear ignition material available from Explosive Technology of Farifield, Calif.

"The ignitor 62 for the pyrotechnic charge 58 is integrated into the air bag triggering circuitry 60 which generates a signal at the time that the air bag deployment is to occur which sets off an ignition 62 associated with the pyrotechnic charge 58. Upon ignition, the pyrotechnic charge very rapidly propagates along the enclosing tube 56. The enclosing tube 56 is partially flattened along the outer sides as shown and hence is capable of a substantial expansion under the pressure developed by the pyrotechnic charge 58 which causes the sharp cutting edge 48 formed on the outer side of the tube 56 to be driven outwardly a sufficient distance to penetrate the tough covering layer 14. This occurs extremely rapidly and in sufficient time such that the inflating air bag will encounter the ribbed door substrate panel 22 immediately after or simultaneously with penetration of the skin 14 with the cutting edge 48. The projecting lip 52 of the door substrate panel 22 also acts to assist in the penetration of the overlying foam layer 16 and covering layer 14.

"Accordingly, the resistance to hinging open of the substrate panel 22 is greatly reduced such that the deployment of the air bag is not compromised.

"In the embodiment according to FIG. 1, the linear element 46 is mounted on the frame 38, and is therefore adapted to "H" pattern door openings shown in FIG. 1A. The cutting edge 48 remains present after the tube 56 expands."

Figure 21:
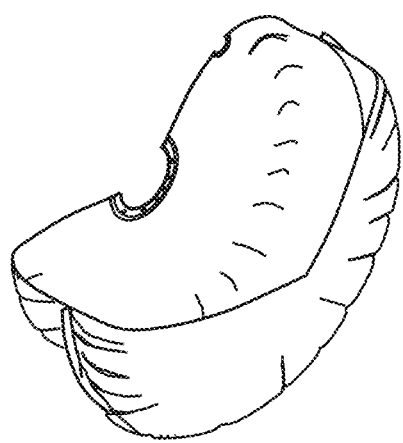
FIG. 21 illustrates a sheet of Nylon film reinforced with graphene to increase the tear resistance of the file for use in constructing a film airbag.
Figure 21:
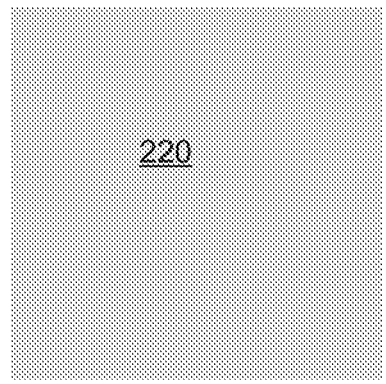

A sheet of Nylon film reinforced with graphene to increase the tear resistance of the film for use in constructing a film airbag is illustrated in FIG. 21. Although the theory as to why a small quantity of graphene, from 0.1% to 1%, has such an effect is still being investigated, it appears to be a similar mechanism as results when a small percentage of beryllium is added to make beryllium copper. The particles of beryllium interfere with the way in which the copper cells or domains can move relative to each other. Nylon film, it is believed, is also made up of cells and tearing is facilitated by the cell boundaries. A small amount of graphene in the cell boundaries interferes with the ability of the Nylon film tears to propagate along these boundaries thereby increasing the material's tear resistance. Due to the nano scale of the graphene particles, FIG. 21 does not illustrate the individual particles but only the slight discoloration of the otherwise clear Nylon film 220.

With structure described above in any one or more of the various configurations, principle objects of this invention are obtained, including, but not limited to:

1. providing a very low cost airbag system.
2. providing a system with a very low cost crush zone mounted crash sensor which requires a crash causing significant vehicle deformation to trigger, thus substantially eliminating rough road deployments.
3. eliminating electrical connections to the driver airbag mounted on the steering wheel and thus eliminating the costly "clock spring" connection system.
4. utilizing propellants which are readily and inexpensively available in most countries.
5. sufficiently diluting the products of combustion from the gas generators through aspiration creating a breathable environment after deployment when the propellant combustion products contain pollutants, such as carbon dioxide.
6. minimizing wiring cost by placing the energy required to initiate airbag deployment within one or both airbag modules and optionally utilizing a digital signal for driver airbag deployment over the same wire that carries power to charge an airbag capacitor power supply.
7. substantially reducing cost of the airbags by using woven or reinforced film, eliminating the tethers, eliminating the vent holes by venting through the inflator and augmenting, minimizing or eliminating sewing through heat, adhesive or vulcanization sealing.
8. simplifying the airbag cover by manufacturing it from a thin high strength plastic, such as polycarbonate through injection molding.
9. initially deploying the airbag through a special charge of very high temperature low density propellant, such as boron potassium nitrate (BKNO3), to aid in starting the aspiration and remove the airbag cover.
10. forming the gas generator and aspiration nozzle housing substantially from plastic.
11. eliminating the need for occupant sensors through friendly non-injuring aspirated inflated airbags.

Other objects and advantages may become apparent from the detailed description of the preferred embodiments above.

Disclosed above are preferred implementation of the invention that include:

1. A single point crash sensor comprising one or more MEMS accelerometers mounted in the passenger airbag ECU. In one preferred embodiment, a single MEMS accelerometer in used in conjunction with a low cost GPS chip which is used to correct errors in the MEMS accelerometer. In another preferred embodiment, up to three accelerometers and three gyroscopes are used making up an inertial measurement unit (IMU) which can be coupled to a low cost GPS chip to improve the accuracy of the devices making up the IMU through a Kalman filter. Such an IMU can also be used for electronic stability control, rollover sensing, navigation and other applications where an accurate measurement any or all of the acceleration, velocity, angular velocity, displacement and angular displacement would be useful.
2. An alternate crash sensor system can use a CrushSwitch® crash sensor mounted in the front of the vehicle sufficiently rearward of the bumper such that bending and triggering of the sensor are indicative of the crush associated with a crash having a velocity change of typically 8 MPH or more.
3. A driver side airbag module where an airbag is mounted on the steering wheel and rotates therewith and a gas generator can be fixed to the steering column where it does not rotate with the steering wheel. The gas generator can be an aspiration system with a pumping ratio exceeding 2.0 to as high as 10 or more. Part of the aspiration nozzle is fixed with the gas generator and the mating part is fixed with the steering wheel and rotates therewith. A preferred gas generating material can be selected from the group of single, double or triple base smokeless gun propellants, although many other propellants, such as guanidine nitrate or conventional airbag propellants such as sodium azide, can be used. An alternate gas generator uses compressed gas.
4. An optional passenger side airbag module mounted in the instrument panel and also contains an aspiration system with a pumping ratio between 2.0 and 10 or greater and can use a smokeless gun propellant or other propellant or compressed gas as in the driver side airbag module.
5. A simple electronic control module housed within the passenger airbag module and connected to the CrushSwitch or electronic crash sensor and to the driver airbag module through appropriate wires. When the CrushSwitch closes indicating a crash requiring an airbag deployment, the electronic package closes a switch which initiates deployment of both the passenger and driver airbag systems. Alternatively, it can send a coded digital signal to the driver airbag system to simultaneously initiate deployment of the driver airbag.

6. When the digital signal implementation is used, the driver airbag system may contain an electronic module which decodes the signal from the passenger module and closes a switch deploying the driver airbag.
7. Both the passenger and driver airbag modules may contain capacitor energy storage devices when the digital signal for the driver system is used which provide sufficient energy to initiate deployment of their respective airbags. Alternatively, when a direct fire system is used, a single capacitor, preferably located in the passenger module, can provide sufficient energy to fire both driver and passenger systems. However, for reliability reasons, two capacitors can be used even when both are in the passenger module to prevent the case where an excessive current is drawn therefrom by one airbag module thereby robbing the required current from the other module.
8. A wire connects the vehicle battery to the passenger airbag module which maintains the energy storage capacitor, if used, in a charged state in the passenger module and through the wire connecting the passenger module with the driver module, it can also maintain the driver capacitor in a charged state when one is present. Alternately, the wire can provide power to the airbag modules directly without the use of energy storage capacitors or in parallel with them.
9. The driver and passenger airbags may comprise woven plastic film, various parts of which can be sewn, heat-sealed, adhesive-sealed and/or vulcanized together. Alternately, the airbags can be made from a reinforced plastic film where the reinforcement is made from a suitable high strength material. One or both airbags can be without vents with the venting function provided by flow through the aspirated inflator. The woven plastic film is typically made from Nylon® ribbons having a thickness of between about 0.001 and about 0.006 inches and a width between about 0.01 and about 0.1 inches. The ribbons may be pre-stretched to align the molecules and increase their tensile strength. The tensile strength of the ribbons is typically about 30,000 psi (210 mega Pascals (MPa)) but other tensile strength materials can be used having a tensile strength between approximately 10,000 psi and 80,000 psi. The woven film is typically coated with polyurethane or silicone rubber having a thickness of between approximately 0.0002 to about 0.001 inches. The seams joining different parts of the airbag together are sewn, heat-sealed or adhesive-sealed together.

This application is related to U.S. Pat. Nos. 5,505,485, 5,653,464, 5,684,701, 5,746,446, 5,772,238, 5,863,068, 6,149,194, 6,175,787, 6,179,326, 6,234,519, 6,250,668, 6,326,704, 6,328,126, 6,410,265, 6,484,080, 6,532,408, 6,533,316, 6,557,889, 6,609,903, 6,685,218, 6,715,790, 6,733,036, 6,738,697, 6,823,244, 6,905,135, 7,040,653, 7,481,453, 7,744,122 and 7,820,566, all of which are incorporated by reference herein, along with any applications that are parent applications or continuations applications of one of the applications that issued as one of these patents.

Moreover, any applications, publications and patents mentioned above, are incorporated by reference herein in their entirety and made a part hereof.

Although several preferred embodiments are illustrated and described above, there are possible combinations using other geometries, sensors, materials and different dimensions for the components that perform the same functions. The inventions disclosed herein are not limited to the above embodiments and should be determined by the following claims. There are also numerous additional applications in addition to those described above. Many changes, modifications, variations and other uses and applications of the subject invention will become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the following claims.

The invention claimed is:

1. An aspirator for an airbag deploying into a vehicle passenger compartment, comprising:
    a housing comprising an innermost and an outermost wall, said housing defining an inlet at a proximal end and an outlet at a distal end leading to the airbag and a plurality of coaxial flow passages between said innermost and outermost walls into which air from a passenger compartment flows to inflate the airbag; and
    an aspiration system for directing gas into said flow passages to mix with the air from the passenger compartment in said flow passages, said aspiration system including openings on an inner side of said outermost wall and on an outer side of said innermost wall.

2. The aspirator of claim 1, wherein said housing further includes at least one interior wall arranged between and spaced apart from said innermost and outermost walls such that said flow passages are defined by said innermost wall, said outermost wall and said at least one interior wall.

3. The aspirator of claim 2, wherein said aspiration system further includes a respective annular distributor arranged rearward of each of said at least one interior wall and openings extending from said annular distributor on both sides of each of said at least one interior wall.

4. The aspirator of claim 3, wherein said aspiration system further comprises at least one tube associated with each annular distributor.

5. The aspirator of claim 1, wherein said innermost and outermost walls each include a cylindrical portion at a proximal end of said housing and a truncated conical portion at the distal end of said housing.

6. The aspirator of claim 1, wherein said housing further includes at least one separation wall extending between and connecting said innermost and outermost walls.

7. The aspirator of claim 1, wherein said openings are configured such that the gas is directed from said openings into said flow passages in a direction substantially parallel to a flow direction of air into said flow passages.

8. The aspirator of claim 1, wherein said housing defines inlet openings at a proximal end in flow communication with said flow passages.

9. The aspirator of claim 1, wherein said outermost wall includes a plurality of apertures to provide for flow communication between one of said flow passages defined by said outermost wall and ambient atmosphere around said housing.

10. An aspirator for an airbag deploying into a vehicle passenger compartment, comprising:
    a housing comprising an innermost wall, an outermost wall, and at least one interior wall arranged between and spaced apart from said innermost and outermost walls, said housing defining an inlet at a proximal end, an outlet at a distal end leading to an airbag and a plurality of annular flow passages between said innermost and outermost walls into which air from a passenger compartment flows to inflate the airbag; and
    an aspiration system for directing gas into said flow passages to mix with the air from the passenger compartment in said flow passages, said aspiration system including openings on an inner side of said outermost wall, on an outer side of said innermost wall, and on both sides of each of said at least one interior wall.

11. The aspirator of claim 10, wherein said aspiration system further includes a respective annular distributor arranged rearward of each of said at least one interior wall, said openings on both sides of each of said at least one interior wall extending from said respective annular distributor.

12. The aspirator of claim 11, wherein said aspiration system further comprises at least one tube associated with each annular distributor.

13. The aspirator of claim 10, wherein said innermost and outermost walls each include a cylindrical portion at a proximal end of said housing and a truncated conical portion at the distal end of said housing.

14. The aspirator of claim 10, wherein said housing further includes at least one separation wall extending between said innermost and outermost walls.

15. The aspirator of claim 10, wherein said openings are configured such that the gas is directed from said openings into said flow passages in a direction substantially parallel to a flow direction of air into said flow passages.

16. The aspirator of claim 10, wherein said housing defines inlet openings at a proximal end in flow communication with said flow passages.

17. The aspirator of claim 10, wherein said outermost wall includes a plurality of apertures to provide for flow communication between one of said flow passages defined by said outermost wall and ambient atmosphere around said housing.

18. An aspirator for an airbag deploying into a vehicle passenger compartment, comprising:
   a housing comprising an innermost and an outermost wall, said housing defining an inlet at a proximal end, an outlet at a distal end leading to an airbag and at least one flow passage between said innermost and outermost walls into which air from a passenger compartment flows to inflate the airbag; and
   an aspiration system for directing gas into said at least one flow passage to mix with the air from the passenger compartment in said at least one flow passage, said aspiration system including a first annular distributor arranged rearward of said innermost wall, a second annular distributor arranged rearward of said outermost wall, openings extending from said first annular distributor on an outer side of said inner wall and openings extending from said second annular distributor on an inner side of said outermost wall.

19. The aspirator of claim 18, wherein said housing further comprises:
   at least one interior wall arranged between and spaced apart from said innermost and outermost walls such that said flow passages are defined by said innermost wall, said outermost wall and said at least one interior wall; and
   at least one additional annular distributor each arranged rearward of a respective one of said at least one interior wall, said aspiration system further including openings extending from each of said at least one annular distributor on both sides of the respective one of said at least one interior wall.

20. The aspirator of claim 19, wherein said aspiration system further comprises at least one tube associated with each annular distributor, said innermost and outermost walls each include a cylindrical portion at the proximal end of said housing and a truncated conical portion at the distal end of said housing, said housing further includes at least one separation wall extending between and connected to said innermost and outermost walls, said openings are configured such that the gas is directed from said openings into said flow passages in a direction substantially parallel to a flow direction of air into said flow passages, and said housing defines inlet openings at a proximal end in flow communication with said flow passages.

* * * * *